Figure 1:
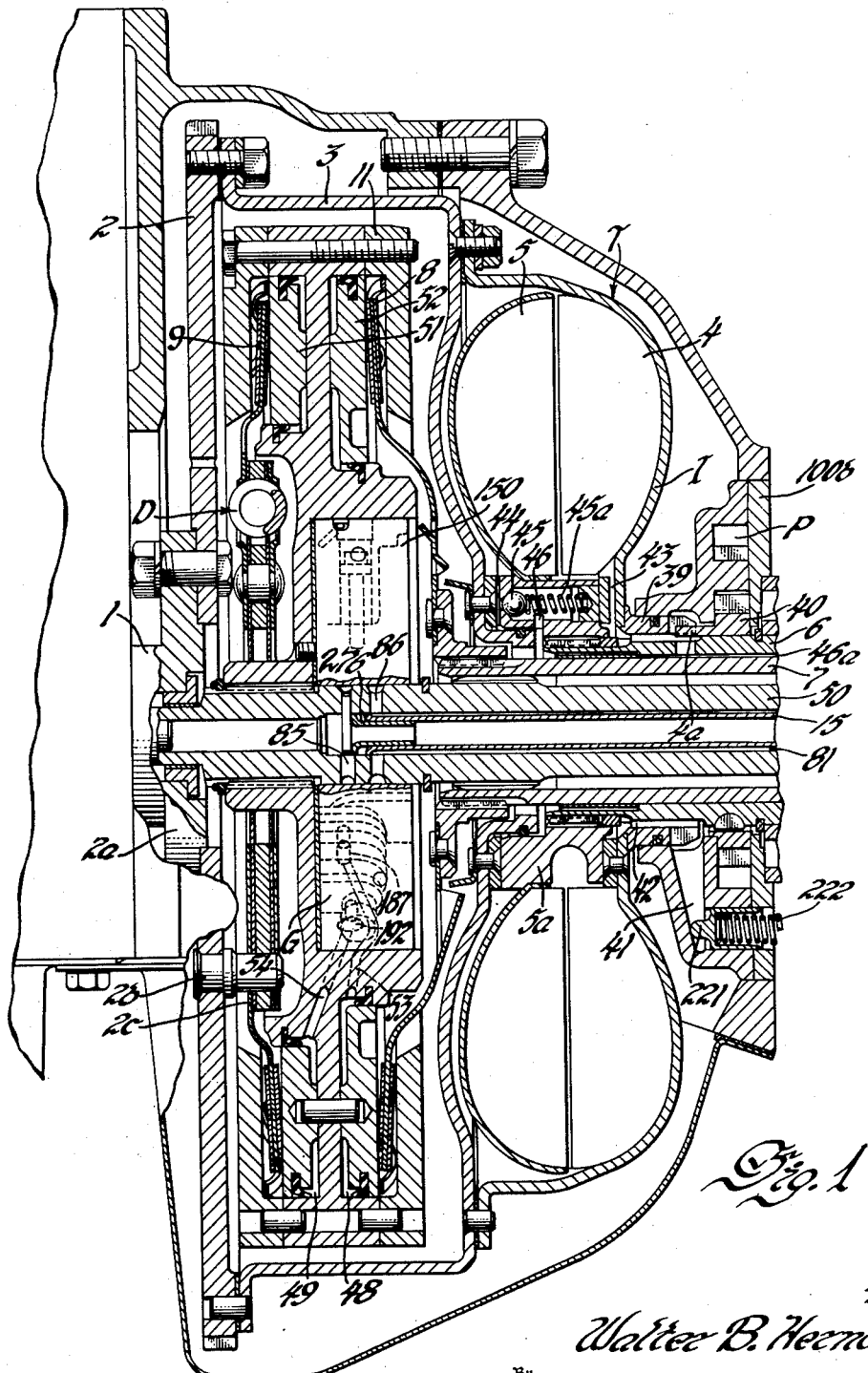

July 26, 1955 W. B. HERNDON 2,713,798
SELECTIVE AUTOMATIC DRIVE
Filed June 12, 1948 7 Sheets-Sheet 1

Inventor
Walter B. Herndon
By
Spencer, Willits, Helwig & Baillio
Attorneys

July 26, 1955  W. B. HERNDON  2,713,798
SELECTIVE AUTOMATIC DRIVE
Filed June 12, 1948  7 Sheets-Sheet 2
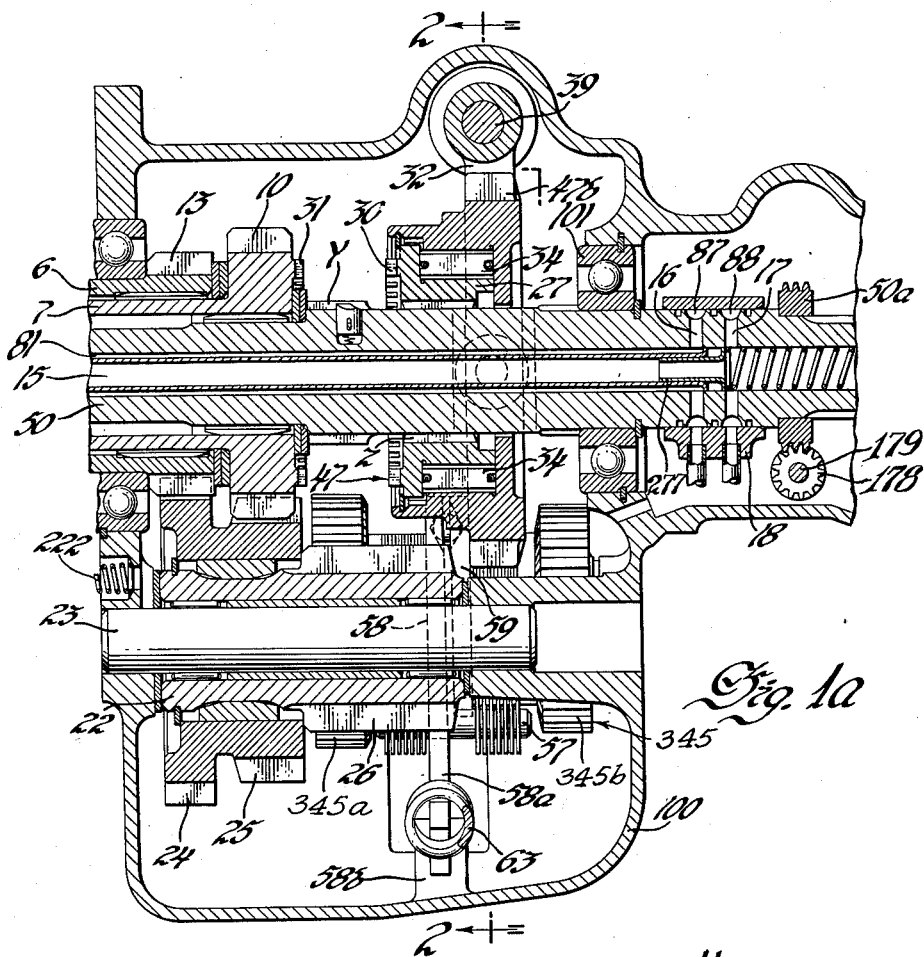
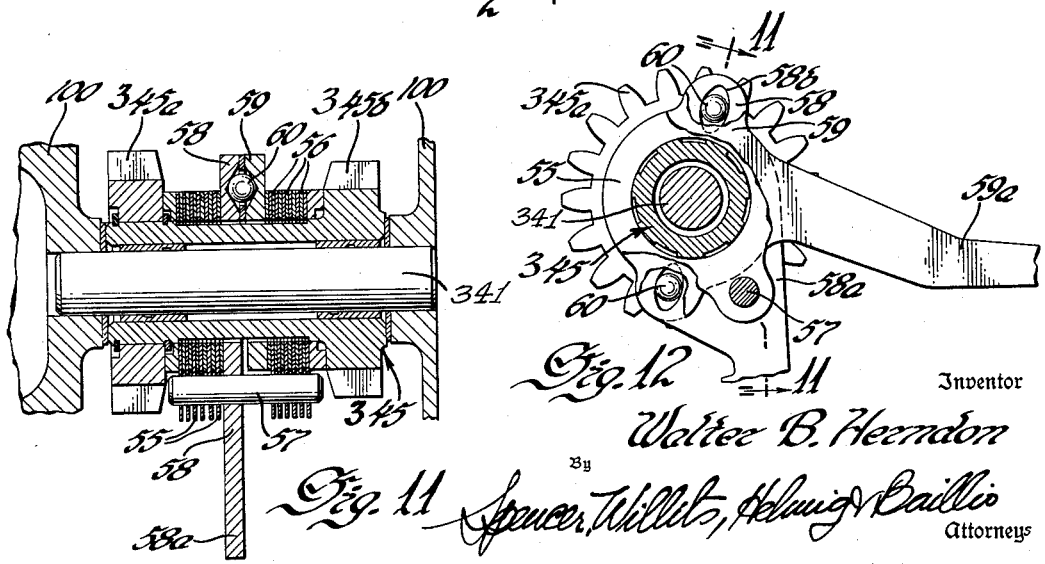
Inventor
Walter B. Herndon
By
Spencer, Willits, Helwig & Baillio
Attorneys

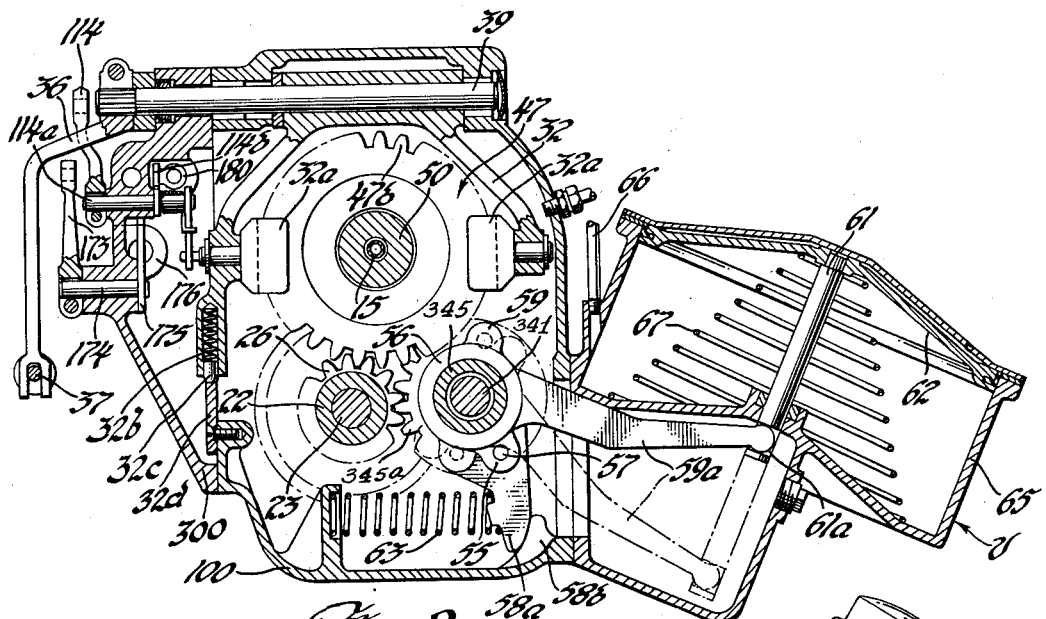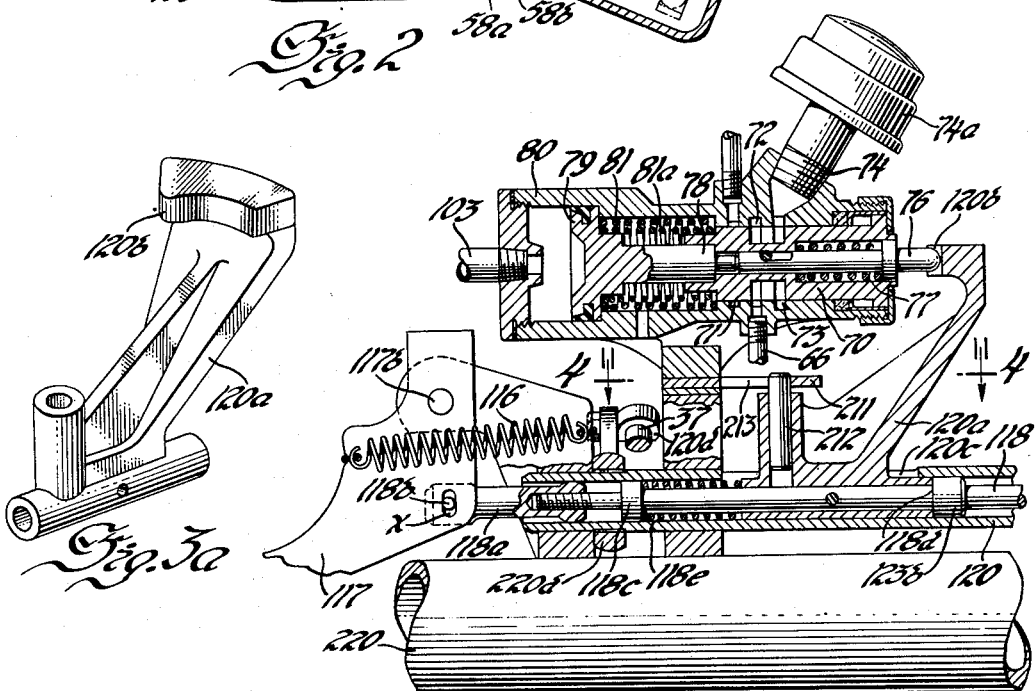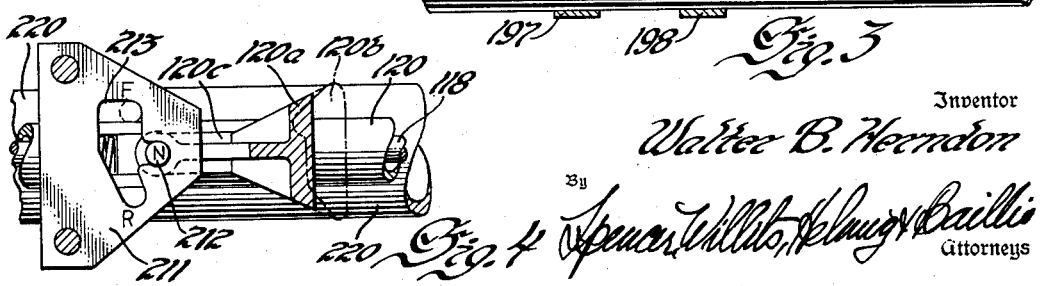

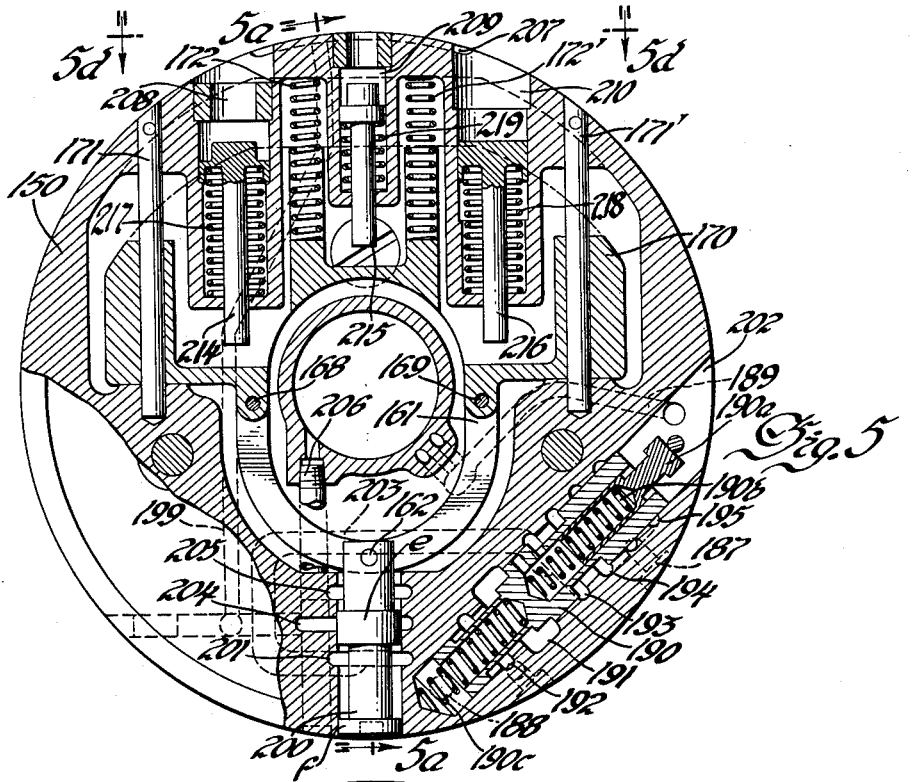
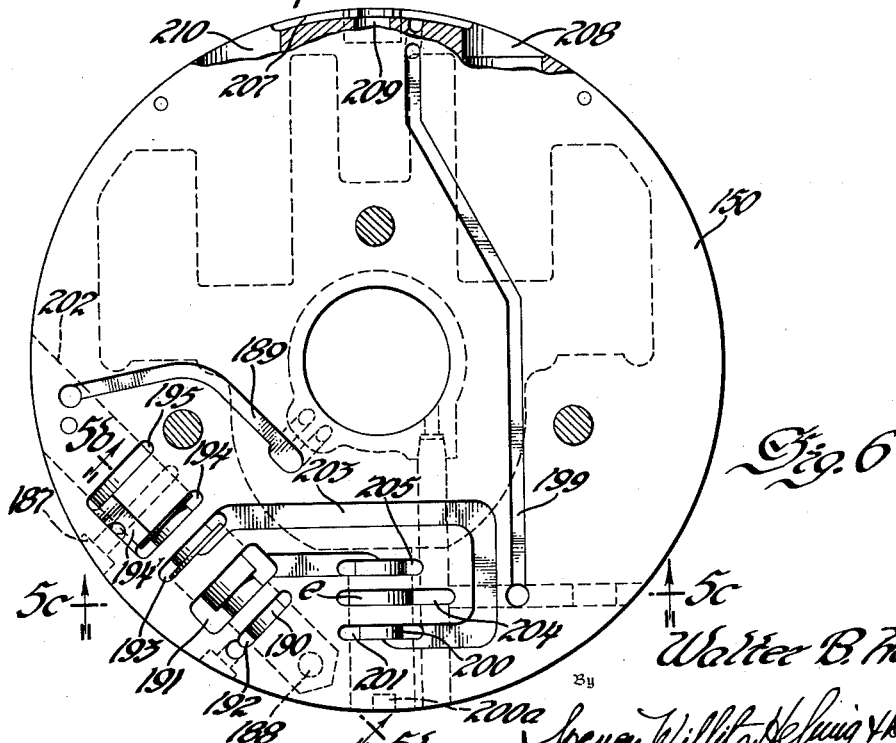

July 26, 1955  W. B. HERNDON  2,713,798
SELECTIVE AUTOMATIC DRIVE
Filed June 12, 1948  7 Sheets-Sheet 5

Inventor
Walter B. Herndon
By
Spencer, Willits, Helwig & Baillio
Attorneys

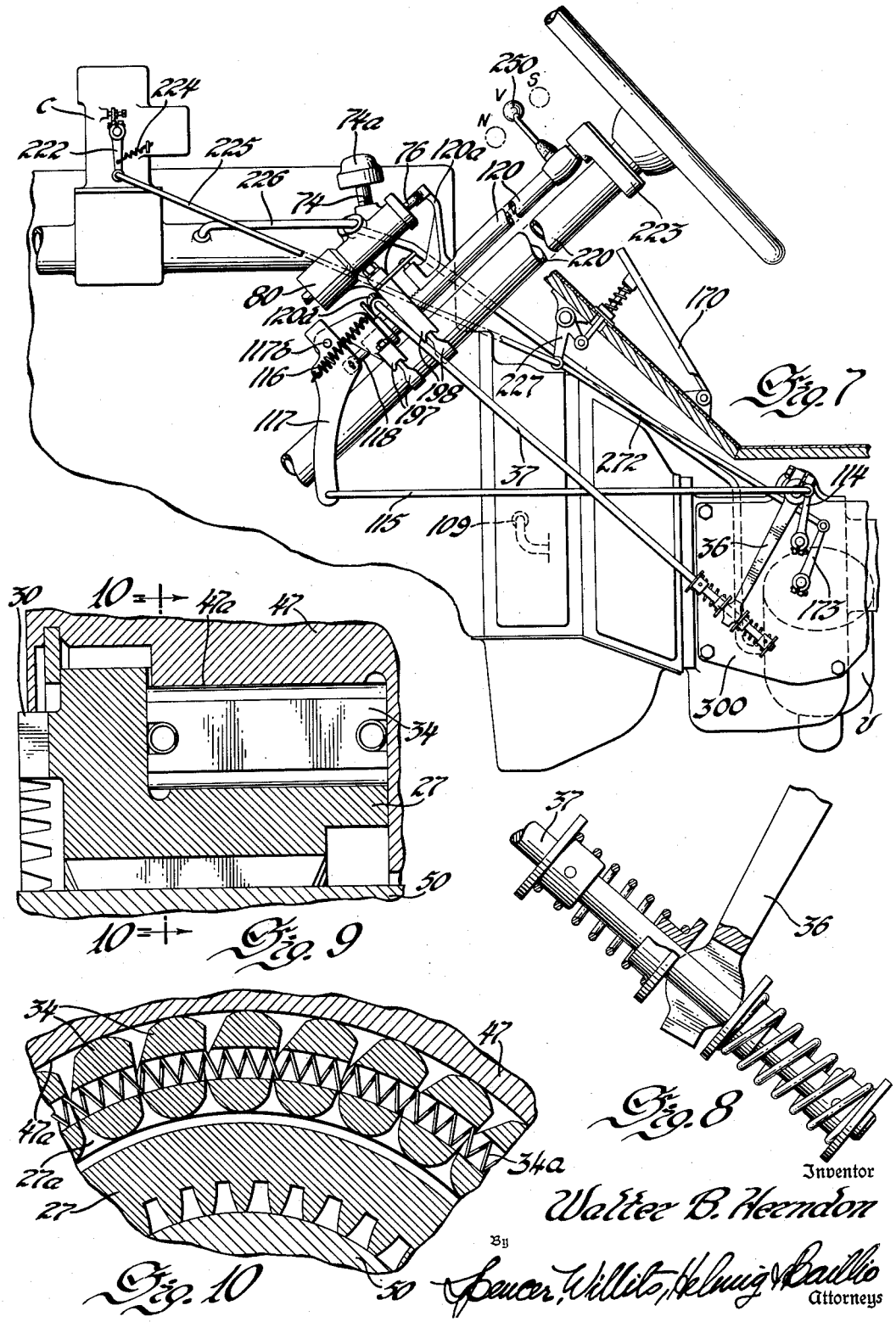

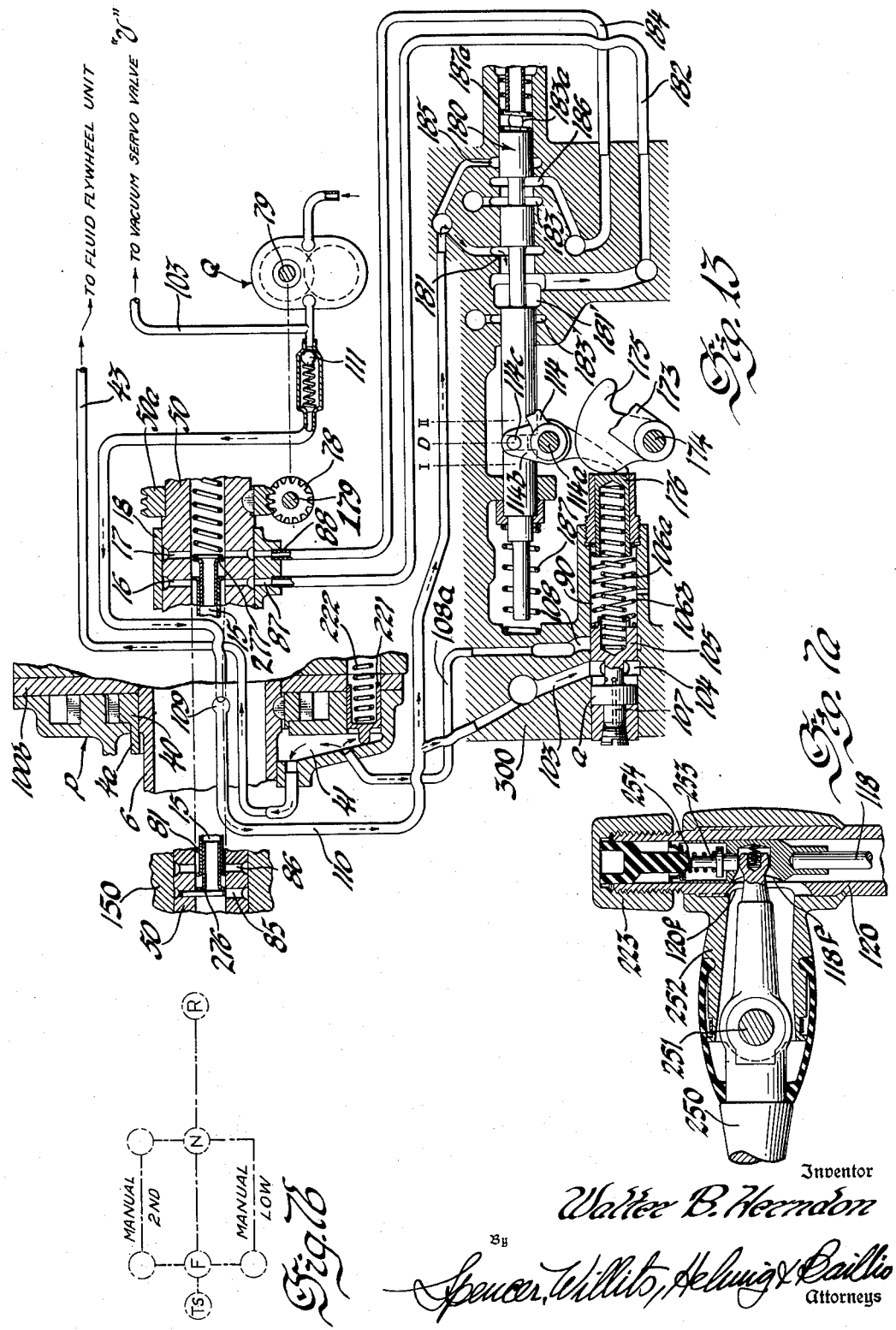

United States Patent Office 2,713,798
Patented July 26, 1955

2,713,798

SELECTIVE AUTOMATIC DRIVE

Walter B. Herndon, Rochester, Mich., assignor to General Motors Corporation, Detroit, Mich., a corporation of Delaware Application June 12, 1948, Serial No. 32,656

32 Claims. (Cl. 74—336.5)

The present invention relates to special forms of gear drive mechanism in which the reduction gear torques are transmitted by fluid turbine devices, and which are equipped for direct coupling of the engine with the load shaft for normal driving. It relates to a compact arrangement of clutches and constantly meshed gears with a fluid turbine drive unit constantly driven by the engine, and to the means for actuating the change of drive ratio by fluid pressure operated mechanism controlled both automatically and manually.

The invention further relates to an arrangement of fluid pressure actuation devices and controls therefor, yielding automatic selection of drive ratio through a governor and through a conditioning control operated by the engine-throttle accelerator pedal and relates to a coincidentally operating arrangement of fluid-pressure-operated valving capable of graduating the torque capacity of the clutches, providing automatic change of ratio in accordance with the driver torque demand expressed by opening or closing of the engine-throttle accelerator pedal.

An object of the invention is to provide in such an automatically controlled drive, a forward, neutral and reverse control which shall likewise control the spinning inertias of the engine connected parts during the periods of changing of the drive from forward through neutral to reverse and from neutral into either forward or reverse. This object is attained by the use of a special spin-preventing means consisting of a friction brake energized by the engine vacuum force acting through a vacuum servomotor, and thereby energized by a self-loading mechanism which yields a spin-braking effect proportional to the residual torques required to be absorbed by the friction elements of the brake.

It is an object of the invention in combination with the preceding object, to provide by the spin-prevention means, a facility for avoiding the crashing of clutch jaws, when it is desired to connect the torque directly with elements constantly coupled to the engine through the gearing and through the aforesaid fluid unit, wherein the said jaws are utilized to provide engine braking, such as by a parking brake.

It is an object of the invention to provide a fluid pressure supply system capable of operation whenever the engine or the load shafts are rotating, which system serves the purposes of providing actuation for the change of ratio by the clutches of the transmission, the maintaining of the fluid unit properly filled, the lubrication of the driving parts by the oil fed from the latter unit, and lockout action over the spin-prevention means during drive periods of the vehicle.

A further object is the provision of automatic speed ratio changing control means in which a valve is moved by weights responding to the speed of the load shaft and to the degree of pressure in the pumping system so as to yield appropriate changing of forward driving ratio. It is a further object herein to vary the aforesaid operating pressure by a valve moved in accordance with the positioning of the engine throttle pedal, which valve delivers a portion of the fluid thus controlled, to the working space of the fluid flywheel unit.

An additional object is to provide special overcontrol means for the said speed responsive valve, which shall be effective to set aside the fluid pressure flow to the governor device, while delivering the pump line pressure to one of the clutches for the continuation of manually selected drive in a gear ratio other than that selected by the governor, thus making it possible for the operator to have available at all times the ability to drive in selected gear ratios such as for negotiating long hills both on the ascent as well as descent, with engine braking, and similar usages.

It is a further object of the invention to provide mechanical control for the shift of the transmission to forward, neutral and reverse by the operator, which control is likewise connected with the aforesaid valve arrangement so that under driving conditions wherein it be desired to continue the drive indefinitely in a gear ratio, the control effect required is obtained through the same manual operating means which normally selects forward or reverse drive.

An additional object is the provision of a compact governor and overcontrol unit placed in a housing compartment located within the clutch drum connected to the transmission output shaft, the governor mechanism comprising a centrifugal weight operating a three-position ratio selector valve movable radially from an outward position to an inward position, providing upshift from reduction gear drive to direct drive, said mechanism including a shift-transition or timing valve subject to the effective pressure created by the said pumping system for determining the exact interval when the shift from 2nd to 3rd or from 3rd to 2nd occurs, for example. It is a supplementary object in connection with the last-mentioned object to provide means for establishing selected governor pressure levels, predetermined for the different operating conditions, effective to cause a movement of said governor operated valve in definite steps, this arrangement consisting of calibrated spring loads against which the centrifugal force of the governor weight is exerted, and pressure responsive plungers of differing diameters actuated by fluid pressure to oppose the governor weight action, and by additional springs to assist the weight action.

The attaining of the above objects results in a number of advantages, in which special utility, as will be understood further, is found.

The overall driving mechanism used as an example for the present invention is a constant mesh type of gear arrangement having plural input and output clutch means, the former including a fluid flywheel unit driven constantly by the engine. The output clutches described in the specification and shown in the drawings appended, are friction clutches housed within an overhanging drum attached to the transmission output shaft, the clutches being fluid pressure actuated by annular pistons fed from passages in the drum from a centrally located valve chamber in which the governor mechanism is housed. Plural passages are provided in said output shaft one of which serves to deliver the speed ratio changing pressure to the governor and the clutch pistons, and the other of which is an overcontrol for selectively compelling drive to be maintained indefinitely in reduction gear, when desired.

The governor mechanism is housed within the said drum and fitted therein so that the clutch actuating pressures are delivered directly to the clutch feed passages. The low gear train of the transmission is connected to the engine through a fluid flywheel device and to the tail shaft or load shaft through a free wheel clutch located within a traversing slider gear, whereas the second or intermediate speed is alternately delivered through one of the above-mentioned friction clutches to the output shaft, which arrangement permits automatic and easy shifts between low and intermediate speed ratio by the simple actuating or release of the aforesaid friction clutch.

The novel arrangement of the low speed and reverse output gear in combination with a free-wheel clutch and an auxiliary jaw clutch provides a new and useful function, as referred to above, for a towing start, this slider assembly translating axially to yield forward low gear with free-wheeling, and parking braking in sequence when the slider is moved from neutral to forward drive, and providing reverse drive when it is moved from neutral in the opposite axial direction.

The fluid pressure feed system as described consists of two pumps, one driven by the engine, the other driven by the load shaft, their effective pressures being combined and fed in parallel to a line pressure regulating valve operated by the engine accelerator pedal, and to a manually operated control valve which permits or prevents pump pressure from being fed to the governor and to the clutch actuator pistons.

The spin-preventing means noted above, consists of a set of friction discs, one group non-rotating, the other group rotating with the reverse idler gear which is constantly meshed with the transmission countershaft train, the friction discs being automatically torque-loaded and brought into contact by initial action of a vacuum servomotor connected to the vacuum of the engine intake manifold controlled by a valve coordinated with the shift motion of the operator's selector handle in setting up forward, neutral and reverse drive. As a safeguard against wrong motion, the vacuum valve is held out of action by a pump pressure operated plunger the pressure value from the rear pump acting on the plunger disabling the valve when the rear pump is in drive operation. This combination makes it impossible for an unskilled driver to burn the discs of the spin-prevention means when the momentum of the vehicle attains given values.

The foregoing stated advantages and objects will appear more in detail below, along with others noted in the specification which follows:

The overall transmission drive assembly is shown in vertical section in two views, Figures 1 and 1a which are respective halves of the assembly. The Fig. 1 portion shows the parts adjacent to the engine and the engine flywheel, whereas the portion in Fig. 1a shows the parts nearest to the vehicle load shaft or transmission output point.

Fig. 2 is a cross-section taken at the line 2—2 of Fig. 1a.

Fig. 3 is a view in part-section of the shift controls which appear in outline in Fig. 7. Fig. 3a is a perspective view of the valve operating member of Figs. 3 and 4. Fig. 4 is a part-section view of a portion of the structure of Fig. 3 shown looking down from the plane 4—4.

Fig. 5 is a detailed view of the governor body located in the output-shaft-connected drum Fig. 1, and shown in section in Fig. 5; the Fig. 6 view being taken from the opposite face with respect to the sectional view Fig. 5. Figs. 5a, b, c, and d are detailed views of the parts of Figs. 5 and 6 taken as indicated on the latter figures.

Fig. 7 is a view of the external linkages of the invention as placed in a motor vehicle, and demonstrates the mechanical arrangements between the various control members. Fig. 7a is a part-section view of the manual ratio shifter mechanism at the top of the vehicle steering column, and Fig. 7b shows the shift pattern diagram. Fig. 8 is a detail of the shifter arm connection of Fig. 7.

Figs. 9 and 10 are part-sectional views taken axially and transversely with respect to the showing of the one-way clutch of Fig. 1a, Figs. 9 and 10 being given merely to show the relationships of the small parts.

Figs. 11 and 12 should be studied in connection with Fig. 2. Fig. 11 is a part-section taken longitudinally, of the spin-preventing mechanism shown in outline in Fig. 1a in connection with the reverse idler gear of the transmission. Fig. 12 is a detail of the self-loading device as shown in Fig. 2 in outline and in Fig. 11 in section.

Fig. 13 shows the transmission control valving directly operated by the driver through the linkages shown in Fig. 7, one valve controlling the value of the pump line servo pressure, and another exerting supervisory control over the governor action. The piping shown schematically in Fig. 13 is to facilitate a clear understanding of the pressure connections with the devices of the other figures.

In Figs. 1 and 1a the engine shaft 1, flanged and bolted to flywheel 2 drives drum 3 affixed to fluid turbine clutch impeller wheel 4. The transmission output shaft 50 extends thru the transmission assembly of the two figures, is piloted at the front end in the end of the engine shaft 1, and is supported in the casing 100 at the rear in bearing 101, as shown in Fig. 1a.

Hollow shaft 7 surrounds a part of transmission shaft 50, being splined at its forward end to accommodate the hub of clutch plate 8, and is formed into a gear 10 at its rearward end. Overlying the shaft 7 is a second hollow shaft 6, splined at its forward end for the hub of driven fluid turbine clutch rotor wheel 5, and formed into a smaller gear 13 at its rearward end.

The transmission shaft 50 is splined at its forward end to the hub of clutch drum member 11 adapted to transmit drive from flywheel 2 or from clutch plate 8 attached to shaft 7 of gear 10.

The flywheel 2 has its attached hub 2a connected by pins 2b to the internal member of vibration dampener D, the external member 2c of which is affixed to clutch plate 9.

The transmission countershaft body 22 rotates on shaft 23 held in the casing 100, and has three gears, the first 24 meshing with gear 13 of shaft 6; the second gear 25 meshing with gear 10 of shaft 7, and the third 26 adapted to engage with teeth 47b of slider assembly 47 rotating with output shaft 50, and constantly driving reverse idler 345a.

The assembly of the 1-way clutch of Fig. 1a consists of an inner piece 27 guided on shaft 50 with clutch jaws 30 projecting forward to mesh with mating jaws 31 formed on the rear flank of gear 10, and having a 1-way clutch race or gripping surface 27a shown in Fig. 10 cut on its external portion lying inside the overhanging portion piece 47 formed to accommodate a shifter fork 32, and toothed at 47b, as noted above. Details of the 1-way clutch construction are shown in Figs. 9 and 10. An inner race 27a is formed in the piece 27 the wedges 34 being inclined as shown in Fig. 10 so that they grip the races together under multiplied engine torque delivered thru the countershaft train to member 47.

The engine flywheel 2 of Fig. 1 attached to engine shaft 1 drives drum 3 and fluid flywheel bladed impeller 4, which by kinetic force of liquid impinging on the vanes of rotor member 5, transmits variable torque to shaft 6 attached to, and driving gear 13 shown in Fig. 1a. The latter gear drives teeth 24 of countershaft member 22 and low gear drive may be transmitted from gear 26 to teeth 47b for rotating output shaft 50. During this operation gear 10 and shaft 7 idle being driven by teeth 25, and clutch plate 8 splined to shaft 7 spins freely. Clutch plate 9 driven from flywheel 2 by pins 2b may also spin freely.

The drum member 11 is splined to shaft 50, and the vibration damper D absorbs torque impulses when engine torque is applied to plate 9 during direct drive. The drum 11 is formed into cylinder spaces 48, 49 to accommodate annular pistons 52 and 51 which may load plates 8 and 9 respectively for transmitting torque. The spaces behind the pistons are connected by passages 54, 53 in drum 11 to governor-control passages connected with tube 15 fitted in a larger bore of shaft 50, the fluid pressure passages so established connecting to radial leads 16 and 17 to gland 18 of Fig. 1a from whence external piping and selective valving provide manually controlled means for establishing actuation for loading of plates 8 and 9, the pumps P and Q supplying the actuation force required, as will be understood further.

At this point in the description, it is not necessary to show full details of such external control valving except to indicate the presence of selector mechanism, to be described further.

Low gear torque is transmitted by flywheel 2, drum 3 thru the fluid unit across the members 4 and 5, to shaft 6, gears 13 and 24, countershaft 22, gear 26 and teeth 47b, 1-way clutch elements 34, piece 27 and output shaft 50.

Second gear torque is transmitted by the fluid unit 4, 5 in the same fashion to the countershaft 22 thru gears 13—24, out thru gears 25—10, shaft 7, clutch plate 8, drum 11 and shaft 50. The freewheel clutch 27—34—47 idles due to the fact that the outer piece 47 is driven more slowly than the inner piece 27 attached to shaft 50, and also when clutch 8, 11 is engaged for 2nd speed drive.

High gear torque is transmitted from flywheel 2 thru clutch plate 9, drum 11 and shaft 50, the clutch 8 being released. Since impeller 4 is constantly coupled to the engine, the rotor 5 spins, along with the hollow shafts 6 and 7, but these parts carry no torque because shaft 50 by running ahead faster than any possible spin speed of gear 47 has uncoupled the overrunning clutch 27, 34, 47. Spin speed of clutch plate 8 is less than drive speed.

Reverse gear torque is established by meshing teeth 47b of slider 47 with teeth 45b of reverse idler 45, the torque being transmitted by fluid flywheel members 4, 5, gears 13, 24, 26 and 45a to the idler.

The 2nd speed clutch 8 is actuated by the pressure delivered to passage 53. The High or direct drive clutch 9 is controlled by pressure delivered from the valve chamber thru passage 54.

For shift to 3rd, or High, clutch 8 is disconnected and clutch 9 connects flywheel 2 direct to shaft 50, the freewheel clutch 27, 34, 47 thereupon idling as in 2nd speed drive.

The fluid coupling unit 4, 5 transmits the torque in Low, Reverse and 2nd, but does not transmit drive in High, hence the vehicle may be used in continuous mountain gradient work, or under full load at low speeds without the heat losses of the fluid device.

In Reverse, slider fork moves the slider assembly 47 to the right to engage the reverse train, idler gear 345a being constantly meshed with gear 23 of the countershaft 22, while teeth 345b are engaged by teeth 47b of piece 47.

In order to permit a towing start and to provide a parking brake effect, the jaw teeth 30—31 formed on piece 27 and gear 10 respectively are meshed when the slider is moved to full left position. This couples the output shaft 50 to hollow shaft 7, and thru the gears 10—25 and 24—13 to hollow shaft 6, rotation being then transmitted thru the fluid flywheel 4, 5 to the engine.

The freewheel clutch used in the 1st gear train may be of a number of types, the construction shown as an example in Figs. 1 and 2 being of the strut type, similar to the disclosure of U. S. 1,694,337 to De Lavaud, which was issued December 11, 1928.

The reverse idler body 345 and the above-described elements provide means to prevent idling spin of the drive parts between the idler member 345 and the engine, which means include the friction plates 55, 56, the self-loading mechanism 55 to 60 of Fig. 11, and the fluid pressure servo actuator piston 62.

As will be understood further, control means are provided for the actuator servo, to coordinate it with the other controls.

Since the freewheel device 27—34—47 of Fig. 1a is in the path of low gear drive, it is desirable that the spinning inertias of the driving parts forward of the torque pick-up point be absorbed to avoid shock loading. With the vehicle at standstill, engine idling, when the operator shifts fork 32 to mesh the teeth 47b with gear 26, it is possible that the idling speed of the engine is sufficiently high to produce a creep torque thru the fluid flywheel 4, 5 on shafts 6 and 7, resulting in spinning of the connected parts, which if not stopped would create unpleasant noise, and cause mis-shift and damage to the mechanical driving elements.

The prevention of shock-loading of the freewheel clutch and the absorption of spin for ease of meshing of gear teeth 47b, 26, 345b, splines $y$ and $z$, and jaw teeth 30, 31 are useful results of this mechanism.

As will be understood further, the operator controls for the selection of forward, neutral and reverse drive, which controls shift the gearbody 47 and the assembly 27, 34, 47, are arranged to operate the vacuum valve 70 of Fig. 3 so as to energize the friction discs 55, 56 of Fig. 11.

The lubrication and fluid servo system is supplied by a first pump P of Fig. 1 consisting of common pump gear elements nested in web 100b of housing 100, and driven by a gear 40 integral with extension collar 4a of fluid impeller I of unit T. The pump P feeds oil into the fluid servo system to be described, and from another point feeds passages 42, 43 leading to the working space of the fluid flywheel 4, 5. Excess pressure in the fluid flywheel working space is continually discharged from the space to the left of the shell of rotor 5 by passage 44 open to check valve 45 loaded by spring 45a, the drain port 46 being open to the space about the hub of clutch plate 8 on shaft 7. Whatever oil passes radially outward to the left of clutch plate 8 may drain thru louvres cut in the plate, so that no centrifugal force component on the fluid can be trapped to cause drag of the plate or to disturb the action of the fluid servo clutch operating system. The unnumbered flywheel louvres may be placed farther outward radially to provide a relatively dry compartment, if needed, while maintaining a balanced head.

The drum 11 being formed into two annular cylinder spaces 48 and 49 into which annular ring pistons 51 and 52 are fitted, has passages 53 and 54 connected to a centrally located control valve chamber 150 described in detail below.

The drum 11 and piston 52 coact to grip clutch plate 8 when pressure is delivered to cylinder 48 via passage 53 from the valve chamber; and drum 11 and piston 51 coact to grip clutch plate 9 when pressure is delivered to cylinder 49 via passage 54 from the valve chamber.

With absence of fluid pressure, the presser pistons 51 and 52 retract so that there is no clutch drag, by waveform springs located between the pistons and the backing members.

The pump Q driven by gears 50a, 178 and shaft 179 of Fig. 1a is indicated schematically in Fig. 13, drawing from the common sump of casing 100 and delivering to pressure space 109 connected with the main pressure feed line 110 thru valve 111. Pump Q always has rotation when the vehicle is in motion, and augments the pressure of pump P during forward drive. When shaft 50 is driven in reverse, the suction space becomes the pressure space, the pressure space generates suction and would drain the pressure line except for valve 111 which closes, the pump elements of Q thereafter idling. Shaft 50 in Fig. 1a has affixed gear 50a driving gear 178 of cross-shaft 179 which is keyed to one pump element.

As will be understood further, the value of pump pressure prevailing, is used in the present invention to establish interlocks against wrong motion. The cam 120b of Fig. 4 is so formed that the rise of pump pressure on plunger 79 prevents the arm 120a and shaft 120 from moving the valve to reverse position when the vehicle has forward motion.

The view of Fig. 2 is to show the relationship between the drive gears of Fig. 1a and the power-operated spin-prevention mechanism, and to show the interconnections between the forward-and-reverse controls, and the control apparatus for the automatic and overcontrol devices described below in connection with Figures 3 to 13.

In studying the spin-prevention mechanism, Figure 11 with Figures 3 and 4, one is required to correlate the connecting elements in a general arrangement such as is given in Fig. 7.

The device of Fig. 11 is located just beyond the plane of the drawing of Fig. 2, and in the lower central portion of Fig. 1a. The spin-prevention servomotor of Fig. 2 is seen also at the lower right portion of Fig. 7, partly in dashed line.

The mechanical linkages pertaining to the valving at the left of Fig. 2 appear in longitudinal arrangement in Fig. 7. The details of the valving are given in Fig. 13.

In Fig. 2 the gearbody 47 of Fig. 1a is shown engaged by shoes 32a of shifter fork 32 attached to the shifter shaft 39 which rocks in drilled bearing portions of the casing 100. The gear 26 shown in Fig. 1, is constantly meshed with the gear teeth 345a of idler body 345 which therefore constantly spins forwardly at a reduced ratio. The reverse idler body 345 shown in Figs. 1a and 11, is supported on shaft 341 mounted in bosses of casing 100 and is toothed at 345a and 345b, while the teeth 345a are constantly meshed with teeth 26 of the countershaft 22, the teeth 345b may mesh with teeth 47b of gear body 47, for reverse gear drive. The central portion of body 345 is splined to accommodate friction discs or plates 56 mating with plates 55 keyed to pin 57 to plate 58. Plate 58 is equipped with arm 58a and in its portion concentric with the discs has semi-oval depressions 58b facing similar semi-ovals in plate 59, which latter has an integral arm 59a, balls 60 or other rolling bodies occupying the oval spaces formed between the plates. This mechanism is an axial cam loading arrangement. The arm 59a of plate 59 extends as shown in Figs. 2 and 12, to intersect notch 61a in the piston rod 61 of the vacuum servo piston 62, while the arm 58a of cam plate 58 has a permitted limited rotation between the stop 58b formed inside of casing 100 and the fully compressed point of spring 63 recessed in an extension of the casing, the spring yielding under rotational force applied to arm 59. The vacuum servo device V of Fig. 2 is mounted on the casing 100 as indicated in Fig. 2, and as shown in outline in Fig. 7, consisting of a cylindrical casing 65 for piston 62, the return spring 67 opposing the suction action of the engine manifold admitted to the underside of piston 62. When there is rotation applied to the idler body 345, such as caused by creep torque, and when the engine vacuum is admitted to pipe 66 for drawing down the piston 62 against the action of spring 67, the arm 58a is moved from its upper position as shown in Fig. 2, to the lower dashed line position, this motion by reference to Figs. 11 and 12, creating differential rotational movement of plates 58 and 59, upon which the balls 60 move into the shallower portions of the semi-ovals, and the resultant axial thrust between plates 58 and 59 squeezes the disc 55 and 56 together. Since plates 55 are stationary and plates 56 are splined to the rotating body 345, the latter plates are braked by the former, the magnitude of the torque determining the proportional loading effect supplied by the balls 60, hence the plates 56, the body 345, the countershaft 22, and connected parts are quickly brought to rest.

Fig. 3 shows the control valving for the vacuum servomotor V in Fig. 2, and also shows the detail of the shifter mechanism by which the operator selects forward, neutral and reverse gear drive.

The steering column 220 has two brackets 197 and 198 which support the parts of the above-noted mechanism, the brackets being bored to receive the lower end of hollow shaft 120. Bracket 198 is the support for the vacuum valve body 80, and likewise supports a guide plate 211 which is intersected by pin 212 mounted in a radially extended portion of the member 120a. The latter member on its outer end is formed into cam surface 120b. Rocking motion of the hollow shaft 120 is restricted by the slot 213 of plate 211 as shown in the view of Fig. 4. The valve body 80 of Fig. 3 contains a vacuum shifter valve 70 ported at 71, 72 and 73; in order from left to right, the port 71 connecting to the engine intake manifold, the port 72 connecting to pipe 66 leading to the vacuum cylinder 65, and the port 73 being open to the atmosphere through connection 74 and air cleaner 74a.

The valve 70 is hollow, and has two internal dimensions, the smaller of which accommodates valve rod 76, the head of which projects to the right to intersect cam 120b, while the larger internal dimension at the right accommodates spring 77, and at the left accommodates plug 78 affixed to plunger 79 of larger diameter. In the left portion of the valve body barrel are two springs 81 and 81a. Spring 81 applies a leftward thrust to head 79 of plunger 78, and spring 81a normally urges the valve toward the right, so that the head of the rod 76 constantly bears against the cam 120b of hollow shaft 120.

In the position shown, the vacuum valve 70 is in an inactive condition, connecting the servomotor pipe 66 with the atmosphere through port 73 and connection 74. When shifted to the left, the valve cuts off the atmospheric port 73 and connects the vacuum port 71 with the servo port 72, admitting the engine vacuum to operate the servo piston 62 and move the lever 59a into the downward position for initiating the action of the self-loading device 58, 59, 60.

The pipe connection 103 leading into the larger portion of the valve body 80 is connected from the pump pressure line 110 shown in Fig. 13 so that when the pump pressure rises above a given value, the plunger 79, 78 will move toward the right, compress springs 81 and 81a, and thrust the valve 70 into the rightward inactive position, so that the vacuum manifold connection 71 is cut off, and the pipe 66 is connected to atmosphere. This is a disabling arrangement to prevent the operator from energizing the spin-preventing brake mechanism of Fig. 11 when the vehicle is in motion, and when the pump pressure indicates that the inertias to be absorbed are too high for the capacity of the braking structure. The spring 77 serves to hold the spacing between valve 70 and rod 76 within the limits of the lost-motion pin-and-slot arrangement shown and permits free axial motion of shaft 120 when the plunger 79, 78 is holding the valve 70 in the inactive position.

Between the brackets 197 and 198, swinging arm 120d is attached to shaft 120, its external pivot end accommodating a ball-joint fitting of rod 37 which operates the shifter lever 36, shaft 39 and fork 32 of Fig. 2. Rotation of handle 250 of Fig. 7 as permitted by the slot 213 for pin 212 shown in Fig. 3 rotates shaft 120 to rock arm 120d, reciprocate rod 37 and rock fork 32 to the forward, neutral and reverse positions.

It is evident that the swinging motion of handle 250 rotates shaft 120 and shaft 118, and that normal reciprocating motion of the handle 250 slides the shaft 120 within the range limits of pin 212 in slot 213, which allows the cam 120b to operate the rod 76 of valve 70. A separate sliding motion is allowed rod 118 to respond to lifting movement of handle 250.

Fig. 7a shows a broken-away, part-construction of the shifter handle and rod head of Fig. 7.

The hollow shaft 120 in Fig. 3, is slotted at 120c to accommodate slidable cam member 120a movable axially with shaft 118 inside of the hollow shaft 120. Rotation of hollow shaft 120 therefore causes member 120a to swing its cam end 120b across the end of plunger 76 of valve 70, to shift the axial motion of 76 as a cam follower and cause the valve 70 to be moved to servo-energizing position when the shaft 120 is moved between forward or reverse gear drive-setting positions.

The intersecting pin 212 in slot 213 of plate 211 being fixed to member 120a limits the rotational motion of both the member and the hollow shaft 120.

The hollow shaft 120 is not permitted axial motion, being held in its mountings for rotation only. It has a slot 118f in the upper portion, in the shifter head of Fig. 7a for intersection with a projecting portion of the shifter handle 250 of Figs. 7 and 7a.

Movement of the handle 250 to rotate the hollow shaft 120 as permitted by pin 212, swings the cam member 120a as described above.

At the lower end of shaft 120, is fixed the arm 120d pinch-clamped and knurled to the shaft, for moving pivoted link 37 for reciprocating lever 36 of shaft 39 of Fig. 2, to move the forward-reverse slider fork 32 of Figs. 2 and 1a.

The hollow shaft 120 in Fig. 4 is mounted for rotational motion only, and is pierced to accommodate slidable fixture 120a, the upwardly projecting portion being restricted by the elongated slot 120c while the stem of the fixture fits inside the shaft 120. This permits relative axial motion of piece 120b but not relative rotational motion. The rod 118 fits inside the bore of 120a and has two abutments 118c and 118d for bearing inside shaft 120. Spring 118e rests against the abutment 118c to press the shaft 118 downward along the shaft 120 into endwise abutment at 118d with the collar of 123b. The axial dimension of the cam plate 211 controls the stroke of cam 120b for operating rod 76 of valve 70.

Rotating movement of handle 250 of Fig. 7 swings the shaft 120, swings pin 212 in slot 213 of plate 211 and swings the cam 120b in an arc across the stem 76 of valve 70. The cam 120b and shaft 118 are normally held to the right by spring 118e pressing the stem 76 to the right.

The face of the cam 120b is shaped to hold the stem 76 in a position to cause valve 70 to admit vacuum from port 71 to port 72 when the pin 212 is in transit between "N" and "F" or "R," and to close port 71 and connect port 72 to atmosphere at 73 when the pin 212 is in "N," "F" or "R," as demonstrated by the spacing of the parts in Figs. 3 and 4.

With the above description it will be understood that shaft 120 is required to have normal rotational selection motion about its axis for shifting to forward or reverse from neutral, the fixture 120b providing the necessary axial motion for operating the valve 70 during the shift interval, while the relation of slot 213 and pin 212 limits this rotation.

Shaft 118 is attached to piece 120a and rotation of the shaft 120 thru slot 120c causes shaft 118, pin 212 and piece 120a to rotate. The shaft 118, pin 212 and piece 120a may reciprocate axially.

The shifter head at the top of the steering column therefore applies rotational motion to both rod 118 and shaft 120, and provides longitudinal motion for reciprocating shaft 118 axially.

This result is obtained by the construction shown in Fig. 7a.

The cooperative action of this arrangement is described further in connection with Figs. 7, 7a and 13.

Figs. 5, 6, 5a, 5b, 5c and 5d are provided to show the exact construction of the automatic ratio control valving which feeds clutch actuating pressure to passages 53 and 54 of Fig. 1, the unit arrangement constituting a ratio governor.

Fig. 5 shows the valve body 150 attached to rotate with shaft 50 and recessed for a weight member 170, for a master shifter valve 200, for pressure-stage plungers 214, 215 and 216, and for valve 190, the body 150 being drilled for the various ports and passages as described below.

The body 150 fits snugly inside the central web of drum 11 and is attached to rotate with the drum and with shaft 50. Body 150 is centrally recessed to accommodate the shaft 50 and to register its passages with fluid pressure leads connected thru the shaft 50 from an external gland.

The valves 200, 190, weight 170 and the plungers 214, 215 and 216 with the appropriate springs constitute the basic automatic ratio control for the ratio clutches 8 and 9, and their action is conditioned by the manually operated, externally located valving shown in Figs. 2 and 13.

The small Figures 5a, 5b, 5c and 5d provide details for clearer understanding of the construction of Figs. 5 and 6. The external cylindrical surface of body 150 is ported to register with the passages 53 and 54 of Fig. 1, and a recess 207 in this outer wall serves as a feed manifold for plungers 214, 215 and 216, sealed by the adjacent inner wall of the web of drum 11.

The manual 2nd and timing valve 190 of Fig. 5 is shown in dashed line in Fig. 6 and is provided to enable the operator to induce manually, a shift to 2nd speed from High, so that the operator is always able to compel and to hold drive in 2nd, without regard to the automatic operation.

The feed to the cylinders 48 and 49 for the actuation of the two clutches 9 and 8 is delivered thru passages 192 and 194 external portion of the body 150.

The automatic ratio control assembly shown in Figures 5 and 6 occupies the inner cylindrical space of drum 11 radially inward of plate 8 and piston 52 of Fig. 1. The control body 150 as noted above rotates with shaft 50. Pump pressure from line 110 is eventually fed to annular passage 87 of gland 18, and thru radial passages 16 to the passage 81 external to tube 15 in shaft 50, being delivered to radial passage 86, and to port 204 of valve 200, and to chordal passage 203 in body 150 to manifold space 207 on the upperside of the body as shown in the figures.

The automatic valve 200 occupies a separate bore in body 150, has two bosses e and f, and is attached pivotally to U-shaped governor link 161 at 162.

Line pressure in port 204 for actuating the clutches is normally available, and likewise in passage 199 and manifold 207. Valve 200 in the lowermost position of Fig. 5 blocks port 204, in next position connects port 204 with port 201 and in the position nearest the rotation center, exposes port 205 also to the line pressure. This serves the three forward speed ratio conditions of Low, 2nd, and High, respectively, as will be understood further.

The governor weight 170 is a formed mass, guided on pins 171, 171', in recesses drilled in body 150, and pivotally connected at 168 and 169 to link or yoke 161 attached to valve 200. With increase of speed of rotation of body 150, the weight 170 slides upward in Fig. 5 on the guide pins 171, 171', to move valve 200 inward from Low toward High.

The effect of the shaft speed on weight 170 and connected parts is calibrated by coil springs 172 and 172' abutting the adjacent face projections of the weight, and is further conditioned by a set of plungers 214, 215 and 216 whose heads are exposed to the line pressure in manifold 207 open to passage 199 in body 150 connected to feed passage 206.

Springs 217 and 218 regulate the pressure values at which the inner ends of the plungers abut the face of the weight 170.

As line pressure in passage 182 varies with accelerator pedal position and speed, the plungers 214, 215 and 216 offer variable resistance to outward movement of the weight 170, and the position of the weight with respect to the port positioning of valve 200 is affirmed by the abutment of the stems of the plungers with chordal flats formed in the upper face weight 170.

The equilibrium of forces composed of the centrifugal force of the weight, the force of springs 172, 172', 217 and 218 and the fluid pressure force on the heads of the plungers 214, 215 and 216, determines the points at which the initiation of the shifts from Low to 2nd, and 2nd, to High, normally takes place. The plungers 214 and 216 move only as far as the 2nd, speed position to control the 2nd, to 3rd, and 3rd, to 2nd, shift. The plunger 215 and springs 172 and 172' control the 1st to 2nd, and 2nd, to first shift.

The diameters of the plungers are taken with respect to the calibration of the governor for the ranges of vehicle speeds and engine powers in which the shift intervals are predetermined.

The lower view of Fig. 6 will assist one to follow the connections of the portings. The lower end of the bore of valve 190 is open to exhaust at the rear face of the body 150 at 188, and port 187 lying between ports 194 and 195 is open to exhaust in the same direction. The ports 194 and 195 are cross connected as indicated in both views. Port 194 leads radially outward into the outer rim of body 150 and feeds pressure for actuating the piston 52 of the 2nd, speed ratio clutch 8 to passage 53 in the drum 11. Port 192 likewise leads radially outward to register with passage 54 in drum 11 leading to cylinder 48 of the direct drive clutch 9.

The outer end of plunger 190a is arrested by a stop pin and is exposed to pressure delivered from passage connected with the central portion of tube 15 thru radial passages 85, and by radial passages 17 and annular passage 88 in shaft 50 of Fig. 1 with the overcontrol line 184 connected to port 186 of valve 180 of Fig. 13.

As shown in Fig. 5 valve 190 is positioned to deliver line pressure from valve 200 to feed port 194, channel 194', passage 53 and cylinder 48 for drive in 2nd speed. Since valve 200 is in its outermost position, the outer boss is clear of bore contact and port 201, passage 203, ports 193, 194 and 195 are all open to exhaust thru slot 200a.

When port 201 is connected to input feed port 204 by inward radial movement of the valve 200, the feed is led directly to channel 53 and 2nd speed cylinder 48.

Upon further inner radial movement of valve 200, to expose port 205 to the pressure of input feed port 204 a new set of circumstances is established. Valve 190, which was not responsive to variations in pressure values for any motion, now has differential pressure areas exposed in ports 191 and 192, the diametral difference in boss area of the valve 190 so exposed creating a tendency for the valve to shift in a direction to shut off the 2nd speed feed port 194, after which action the 3rd speed port 192 is alone feed connected.

Valve 190 in a bore of body 150, serves to measure the transitional torque capacities of the clutches 8 and 9 so that a predetermined degree of torque overlap is maintained during the shifts. It should be remembered that if clutch release of torque of a loaded engine occurs, the engine will speed up, and if a higher ratio clutch is to assume the drive, the engine may have to be pulled down to synchronism by the rise of torque capacity in the second clutch. This phenomenon can be unpleasant to the car driver, for it creates a surge in the vehicle motion, and adds unnecessary differential friction wear on the clutch faces.

Valve 190 therefore is arranged to measure the torque capacities of the clutches in response to line pressure variations and puts a timing factor into the transition of ratio drive, preventing inter-stage engine racing, while maintaining the torque overlap. This guarantees smoothness of shift at all times, as will be understood further.

The valve 190 as shown in Fig. 5 is inactive. Its ports 193, 194 and 195 are connected to port 201 of valve 200, and its port 191 is connected to port 205 of valve 200. Port 200a opens to relief.

Spring 190b recessed in the end of the bore and in valve 190, is opposed by spring 190c recessed in the other end of valve 190, and held inside abutment valve 190a sliding within the valve 190, restrained by an abutment pin. The springs 190b and 190c being calibrated correctly, the valve 190 is at rest in the position shown. Since its axis is symmetrically chordal to the rotation axis of body 150, it does not respond to variations in speed, although some slight response to inertia may be encountered. Unless such inertia effect be desired, the springs 190b and 190c are taken of values in excess of the inertia effects of the mass of the valve 190, and in practice this valve 190 and valve 190a may both be made of light aluminum alloy, the combination providing satisfactory operation under all operating conditions. The inclination of the axis of valve 190 may depart from tangency so as to counteract any undesired inertia effects, if that expediency is required. If a valve rate response is desired, which is to be conditioned by either positive or negative inertia component, the axis of the bore of 190 is inclined inwardly radially with the normal hand of rotation of body 150, or inclined outwardly thereto.

In the inactive state, and with drive in Low, or 2nd, the ports 193 and 194 are balanced by the adjacent bosses, and ports 195 and 187 are covered by the large end boss located upward and to the right.

Now with pressure being delivered to port 205 by valve 200 as in initiating a shift from 2nd to High, ports 191 and 192 of valve 190 are connected to the feed pressure and the differential area pressure tends to shift valve 190 upward and to the right. Port 192 is connected to clutch servo line 54 of Fig. 1 and the valve 190 therefore responds reactively to the existing pressure acting on clutch 9, as a measure of the High clutch capacity. As this capacity rises, the valve 190 moves farther until it exposes the 2nd speed port 194 to exhaust.

In this manner when the automatic valve 200 signals for an upshift from 2nd to High, the valve 190 acts as a monitor or as a measurer of the torque capacity, and delays the timing of the shift to High until the line pressure for clutch 9 is sufficient for it to assume the engine torque, whence the 2nd speed clutch cylinder 49 is eventually exhausted. The pressure against valve 190 to hold it in the new position is sustained by the High clutch loading pressure.

Fig. 6 shows the rear face of the governor body 150 and also the feed line 199 from port 204 to the manifold space 207 open to the spaces 208, 209 and 210 above the plungers 214, 215 and 216. The exhaust ports 188, 187 and 200a open axially directly into the space within drum 3, and between drum 11 and the adjacent radially inward extension of drum 3.

Figure 5A:
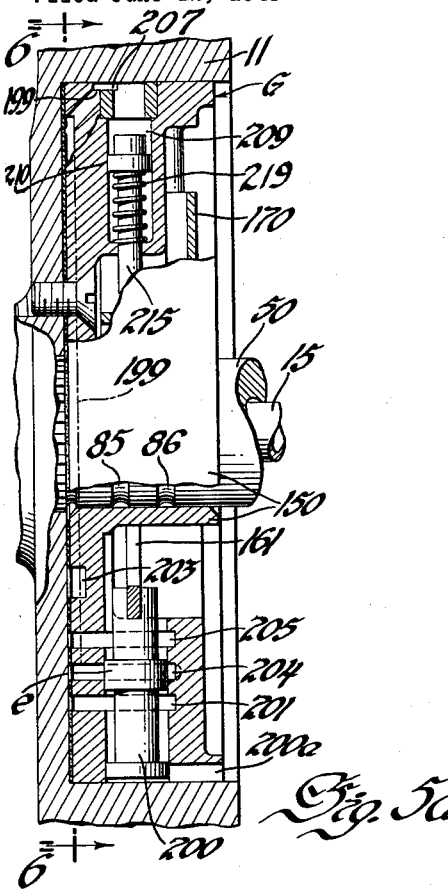
Figure 5B:
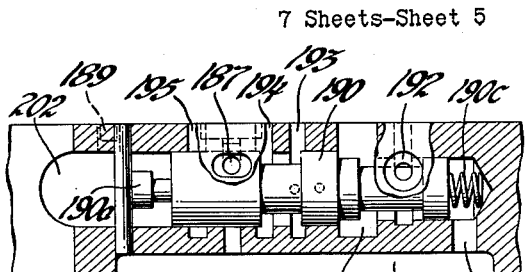
Figure 5C:
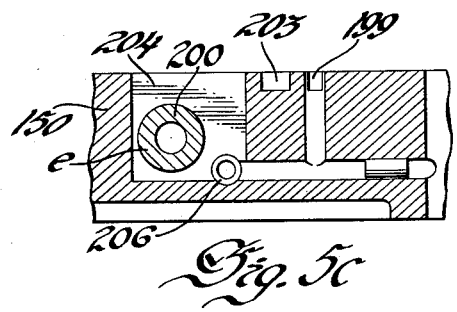
Figure 5D:
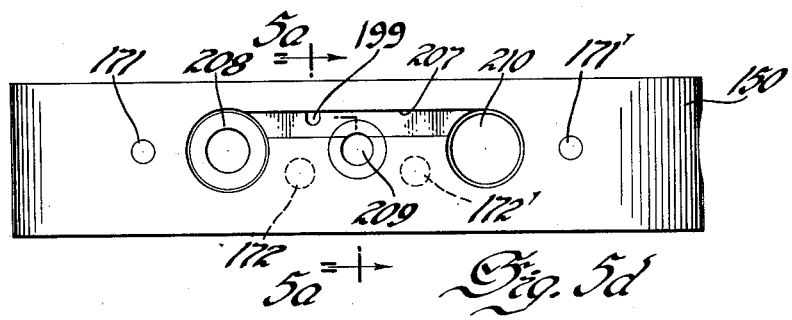

Figure 5a is a vertical section at 5a—5a of Figs. 5 and 5d, with the body 150 broken away to show the details of the porting of automatic valve 200 of the governor G and the spacing and fit of the control parts in the body 150 and drum 11. To facilitate forming the ports 201, 204 and 205 of valve 200 are mill-slotted from the front face of body 150, sealed against the adjacent face of the drum 11.

Fig. 5b is taken along the axis of valve 190 of Figs. 5 and 6 as indicated in Fig. 6 at 5b—5b, and is provided to show the exact relationships of the porting and valve bosses.

Fig. 5c is a part-transverse section across the valve 200 of Fig. 6 as indicated at 5c—5c, and shows clearly the space distribution of the passage connecting port 204 with pressure line 199 leading to manifold space 207.

Fig. 5d is a top view of the valve body 150 as seen from 5d—5d of Fig. 5, to show the connection of lead 199 to manifold 207.

The vertical section of Fig. 1 corresponding to the governor body of 150 and included parts is left unsectioned except for the dashed lines which indicate the major feed connections to apply fluid pressure to the clutch pistons 51 and 52.

The overcoming or overcontrol action provided by pressure fed to passage 184, 85 and 189 will be described in connection with Fig. 13.

The lower portion of Fig. 13 shows the mechanical connections for operating the manual overcontrol valving. A valve body plate 300 fastened to the side of the gearbox as indicated in Figs. 2 and 7 is apertured for the transverse mounting support of shafts 39, 174 and 114a, the external lever 36 being clamped to shaft 39, lever 173 to shaft 174 and lever 114 to shaft 114a.

The plate 300 is formed to accommodate valves 180, 105 and the passages corresponding to the schematic pressure lines 103, 108a, 181, 183 and 184 are drilled and cast in the plate, to register with the appropriate external connections as shown in Fig. 13.

The valve 180 is normally balanced between and by the springs 187, 187a to occupy the position shown. It is shifted axially by the rocking of intersecting pin 114c of lever 114b fixed to shaft 114a of lever 114, which by reference to Fig. 7 is rocked by rod 115 and lever 117, thru reciprocation of rod 118 and handle 250 of Fig. 7a.

The valve 105 is normally held as shown by springs 106 and 106b and is subject to fluid pressure and to rocking of cam 175 of shaft 174 rocked by lever 173 and rod 172 pivoted to the accelerator pedal action bellcrank 227 of Fig. 7, which also operates throttle rod 225 and throttle arm 223 of carburetor C.

The operator's shift control handle 250 of Fig. 7 is connected to rock vertically in a plane parallel to the axis of the shifter shaft 120 and the steering column 220, and is articulated to rod 118 located inside shaft 120. As shown in Fig. 3 the rod 118 is equipped with adjustable fitting 120a having pin 118b intersecting slot X of lever 117 pivoted on an extension of bracket 197. Axial motion of rod 118 may therefore cause lever 117 to swing about pivot 117b. The spring 116 is fastened to the lever 117 and to a convenient point on the bracket 197, its tension tending to load the rod 118 for occupying the uppermost position, and to hold lever 117 toward the right.

This tends to maintain the end of the handle 250 in its normal position for initiation of drive. When the handle 250 is lifted, the rod 118 is depressed, spring 116 is tensioned and the lever 117 is swung clockwise as viewed in Figs. 3 and 7 exerting a pull on the rod 115 to rotate lever 114 of shaft 114a and rotate lever 114b and its valve-operating pin 114c of Fig. 13, the pull being converted into a rightward motion of valve 180. The equilibrium of springs 187 and 187a is unbalanced and pump pressure which was being delivered to governor feed line 182 from 181 is cut off, the feed line 182 is opened to exhaust at port 183 and the overcontrol feed line 184 is cut off from exhaust and connected to pump line pressure from main 110 to port 185.

Release of the handle 250 permits spring 116 to lift rod 118 to the original position and permit the return of the valve 180 of Fig. 13 to the position shown in the figure, restoring pump line pressure to the governor feed line 182 and again connecting the overcontrol line 184 to exhaust at 183.

As explained in detail further therein, the overcontrol pressure is fed into the sealed space 202 at the outer end of valve 190 of Fig. 5, causing the inner valve 190a to move downward, compress springs 190b and 190c, and shift the valve 190 downward so as to cut off line pressure in port 193 and connect the direct drive feed port 191 to exhaust while opening line pressure in port 194 to engage clutch 8 by delivery of line pressure to piston 52.

This form of control enables the operator to continue drive in 2nd speed ratio indefinitely, for unusual driving conditions, and to resume automatic governor ratio selection immediately by release of the handle.

The handle 250 moves in an arc having forward and reverse drive end points and a central point in which a slight drop occurs at the neutral position, as controlled by pin 212 of shaft 120 in slot 213 of Fig. 4.

The construction in Figs. 7 and 7a shows the shifter handle control at the top of the steering column 220. The hollow shaft 120 terminates in a threaded coupling supported rotationally by bracket 223, and is apertured at 120f, the slot accommodating the formed end of hand lever 250, pivoted at 251 to arm 252 attached to shaft 120. Rotation of handle 250 therefore rotates shaft 120, which is restrained against longitudinal motion by the bracket and the lower-end mounting of Fig. 7.

The upper end of the rod 118 is enlarged to form a sliding bearing inside the shaft 120, the enlarged portion being slotted out into a notch 118f registering with the opening 120f in shaft 120, but elongated to permit axial motion of the inserted end of handle 250 in reciprocating the rod 118. The upper end of rod 118 is drilled out to accommodate anti-rattler button 253 which acts as a retainer for spring 254 seated against the rubber bumper shown.

Figs. 7 and 7a show the permitted motion of handlever 250 with respect to the shaft 120, rod 118 and the bracket mounting. It will be observed that rotation of handle 250 rotates the shaft 120, rod 118, piece 120a and cam 120b, pin 212, arm 120d, and small pin 118b in oval slot X of lever 117. Reciprocation of handle 250 reciprocates rod 118 inside hollow shaft 120 to swing lever 117 of Figs. 3 and 7 to swing lever 114 of shaft 114a and operate valve 180 for manual overcontrol of automatic ratio selection.

The normal motion of the lever 250 in one plane at right angles to the shaft centerline of 120, 118 suffices for all ordinary forward, neutral and reverse shifts of drive. The overcontrol for shift to "forced 2nd," is accomplished by lifting the end of the lever 250 vertically when it is in the "F" position. The drive is not engaged in forward until the lever is fully seated in "F," thereafter the operator may compel drive in 2nd, overcoming the normal governor ratio selection action, sustainable as long as desired. When this holding force is released, the springs 118e and 116 which were stressed by lifting of 250 now applying a force to raise rod 118 and rock the handle 250 downward to the normal drive range plane of motion.

The slot 213 of Fig. 4 is so formed that the handle cannot be raised to "forced 2nd" except between positions "F" and "N" and in "F," preventing inadvertent differential spinning of the transmission elements through closing of clutch 8 at a time when the torque would be sufficient to damage the friction surfaces 55 and 56 of the spin-prevention device.

Fig. 8 is an enlarged view of the lost-motion device connecting the forward-reverse shifter lever 36 with rod 37 pivoted to lever 120d of Figs. 7 and 3 which system translates rotational motion of handlever 250 and shaft 120 into rectilinear motion of gearbody 47 of Fig. 1a.

Figs. 9 and 10 are fragmentary views of the details of the overrunning clutch 27—34—47 of Fig. 1a. The race faces 47a and 27a of members 47 and 27 are equally radially spaced to accommodate a plurality of touching strut or wedge members 34 the spring 34a serving to maintain the light contact required for effective overrunning and locking action.

The slider 47 is shown in neutral condition in Fig. 1a. For forward drive, it is moved to the left to mesh the splines y and z, so that member 27 runs with shaft 50, whereupon under engine torque the drive from the countershaft member 22 is transmitted, while under overtaking torque, the overrunning clutch idles. The detent provides stop feel for forward drive.

At full left position of the slider 47, the teeth 30—31 of members 27 and 10 may be meshed causing the output shaft 50 to be solidly connected with shaft 7 of the 2nd speed clutch plate 8, to provide a towing start for the engine, as may be required in cold weather when the car battery may be weak.

The structure of Figs. 11 and 12 has been discussed in full in connection with Figs. 2 and 3. The spin-prevention device shown operates rapidly and effectively during the ratio shift transition period of slider 47 so that the chance of abuse of the slider teeth y and z, of races 47a and 27a, wedge members 34, jaw teeth 30, 31 or gear teeth 47b, 345b, is practically non-existent.

The pump P of Fig. 1 and pump Q of Fig. 13 provide the servo and shift regulation pressure for the transmission. The diagram of Fig. 13 shows the connections from pump outlet port 109 led by passage 103 to the port 104 of pressure regulator valve 105. The pump pressure is led to the left of boss a of valve 105 by orifice 107, and serves to shift the valve to the right against springs 106, which reduces the leakage to exhaust at port 107. There is a natural rise of pressure with pump speed, in passage 103, tending to overcome springs 106 and exhaust the feed lines connected to line 103.

The driver's accelerator pedal is linked by rod 272 as shown in Fig. 7 to lever 173 of shaft 174 operating the cam 175 in Fig. 13, acting against plug 176 to compress springs 106a of valve 105, and may thereby vary the effective pressure in servo line over a selected useful speed and pressure range. For example, if the pump P had a normal initial output rising to 130 pounds over the speed range between idling and maximum, the accelerator pedal by variably loading light spring 106a against the pressure rise motion of valve 105, may create a pressure variation of 50 to 130 pounds per square inch in delivery line 110. The spring 106b reacts against the housing and provides a mean pressure level of about 50 pounds in the line preceding the valve 105.

The manual valve 180 of Fig. 13 controls the pressure conditions for neutral, reverse, forward and 2nd speed manual shift, and as indicated in Fig. 13 is connected to servo feed line 181, to automatic valve feed line 182, and to the manual 2nd speed line 184.

The automatic valve 199, shown in Fig. 5 and indicated in Fig. 6 as noted above, selects the shift from Low to 2nd, and from 2nd to High, automatically; that is, in accordance with speed of the vehicle, and with the degree of throttle opening.

Valve 105 is a throttle-controlled valve of novel utility. Oil pressure from the pump line 110 enters at port 104, passes thru small orifice 107 to the small diameter head at the left of the valve 105. The purpose of the small orifice 107 is to prevent pressure surges from causing undesired rapid reciprocation of the valve.

Springs 106a and 106b regulate the pressure delivered by the valve 105. As the pressure effects vary, the valve 105 moves across ports 104 and 108 to provide a line pressure between the general limits of 50 and 120 pounds p. s. i., in accordance with accelerator pedal position.

The pedal 170 operates cam 175 to compress spring 106a with advancing motion. The two springs 106a and 106b are required in combination with the differential valve area arrangement to guard against excessive reactive pressure on the accelerator pedal 170. The spring 106a is arranged to resist the minimum pressure, taken as 50 pounds, in the present example. The rise between 50 and 120 pounds is provided by spring 106b. The smaller the load factor of the springs, the lower the reactive pressure on the pedal.

The head of the valve is therefore taken as small as commensurate with good design, but capable of dealing with intermittent frictions, while providing the desired pressure resultant proportional to pedal position.

It is desirable that the body of the valve be larger to provide for adequate flow. Excess oil pressure above that needed for clutch and control operation is exhausted into port 108 leading to the space 41 delivering to the working space of the fluid flywheel.

A relief valve 221 open to space 41 may reduce this pressure to a lower value, say about 20 to 30 pounds p. s. i., leading back to the suction side of pump P. Spring 222 measures the pressure value at which valve 221 opens.

The valve 180 is manually operated by the driver's shift lever 250 of Fig. 7a. The lever 250 as indicated in Fig. 7b has three normal positions in planar alignment "N," "F" and "R," and three positions in which it is lifted so as to depress the rod 118. In "F" position lifting of the lever 250 causes clutch 8 to be loaded for drive in 2nd gear ratio, and if pressed downward, from the normal plane, it causes the fluid feed to the governor to be cut off, hence there can be no drive on either of clutches 8 or 9, therefore the low gear train 13—24—26—47b only is connected to drive. In the "TS" position lever 250 provides for a towing start by meshing elements 30, 31 of Fig. 1a.

This arrangement introduces manual overcontrol in a very convenient manner, the operator only having to remember to lift or depress the lever 250 to obtain instant drive in 2nd, or to depress it to obtain instant drive in low gear.

The valve 180 is held by light spring 182 and heavier spring 182a in normal drive position, connecting pump line 110 by ports 181 and 181' to line 182 leading to the governor of Figs. 5 and 6. As shown in Fig. 13 the "forced 2nd" or manual overcontrol line 184 is connected across ports 186 and 183 to exhaust.

Manual overcontrol and primary selection of forward or reverse drive is provided by manually controllable selector valving to be described further.

Shaft 50 of Fig. 13 is centrally bored for separator tube 15, and baffles 276 and 277, together with gland 18, radial passages 16 and 17, annular space 81 and radial passages 85 and 86, and annular spaces 87 and 88 form connecting means for two separate fluid connections between the valve chamber space adjacent the clutches and an externally placed manual valve body 300 shown in Fig. 13.

The valve control assembly of Fig. 13 includes fluid servo pressure regulator device consisting of valve 105 in a bore of body 300 having pump line pressure in port 104 acting on the adjacent face of boss a to move the valve 105 against springs 106a and 106b and thereby provide a regulated servo line pressure having a predetermined proportionality to engine speed, based on the fact that supply pump P is driven by the rotation of the engine. The mechanical connection shown at 175, 176 is effective to vary the loading of regulator springs 106a and 106b and is operated by linkage from the engine accelerator pedal such that the advancing of the pedal to establish higher engine speed increases the degree of regulated pressure effective in the clutch servo system, while retarding of the pedal serves to diminish the clutch actuating pressure. This pressure variation is further used to vary the governor speed control of ratio change, as will be understood further.

The valve 199 operates to direct the regulated pressure from the cylinder 49 of clutch 8 to cylinder 48 of clutch 9 at an engine speed and engine throttle setting for proper shift from 2nd to 3rd speed ratio. If the driver has the accelerator pedal at fully advanced position, the change will not occur until the engine has reached a relatively high speed, for example 3000 R. P. M., which permits the centrifugal force on valve 200 to overcome the effect of the advanced accelerator pedal; whereas if the driver has for example, depressed the pedal to three-quarters throttle corresponding to approximately 2100 R. P. M. of the engine, the speed effect of the weighted valve 200 will be sufficient to close port 201 and open port 205 which will release pressure from cylinder 49 of clutch 8 and direct it to cylinder 48 of clutch 9, for top gear drive.

The design range of engine speeds for this upshift to direct drive will vary with the engine powers available, with axle ratio and wheel size, and with weight of the vehicle, all coordinated to provide the driver with a desirable scale of ratio shifts to suit both traffic and highway driving. Present day driving habits suggest the speed range of 15 to 50 miles per hour for the shift from 2nd to High, in passenger car operation, but in special purpose vehicles this range may be extended or shifted to suit special needs for best effective use of the vehicle.

The valve 200 likewise operates to deliver the regulated pressure for initial operation of the clutch 8, since during drive in Low, only the fluid flywheel 4, 5 is transmitting the engine torque to the gear assembly. At low initial speeds, the accelerator pedal 170 is normally between half and three-quarters throttle, pump speeds are commensurate, and the speed effect upon valve 200 is low since shaft 50 is at about one-third engine speed. Increase of output speed due to advanced throttle and to rise in power available causes valve 200 to move radially outward until feed port 62 to cylinder 48 of clutch 8 is uncovered, whereupon the plate 8 is gripped by the piston 52 and abutment ring 11, and drive in 2nd speed ratio is established.

It will be observed that the two-stage action of valve 200 is novel in this art, as far as now may be determined, for a centrifugally operating valve which initiates drive in a given speed ratio at one speed, and which discontinues that drive while establishing drive in another speed ratio at a higher speed as described herein, is not believed heretofore known.

A further point of novelty lies in the method herein, of providing selective levels of pressure at which the clutches 8 and 9 assume the torque.

The details of the arrangement of Fig. 13 provide operational advantages which guard against difficulties experienced generally with automatic transmissions in which the forward drive ratio changes are made by transferring torque between or among a group of friction clutches since few such devices are wholly protected against slipping of the clutches under torque, and in such cases where there is always more than enough torque capacity to handle the drive without slip, the transition intervals are rough, abrupt and produces a lurch of the vehicle which is undesirable and uncomfortable to the passengers and the driver.

It should be understood that if torque is to be maintained uninterrupted during the ratio change interval, there must be a time when both the direct drive and 2nd speed friction clutches are momentarily transmitting torque. This condition cannot long prevail, when ratio changes are to be made at higher engine and vehicle speeds, without undesirable slip on the part of one or both of the clutches. Such slip is manifest in heating of the clutch surfaces and excess wear. The abraded material shredded from the clutch faces may get into the lubrication system and clog the passages, resulting in starving certain of the running parts.

One method of dealing with this condition in part, is shown in Fig. 13 where accelerator-connected lever 173, shaft 174, cam 175 and plug 176 vary the loading effect of spring 106a on valve 105.

The regulator valve 105 being directly connected to the pump line pressure at port 104, is subject to a fluid pressure force acting on the leftward face of the valve fed thru orifice 107, which force is normally balanced out by spring 106b so that with the light spring 106a unloaded, the leakage port 108 is opened and closed by minor variations in pump line pressure appearing in port 104 at an average pressure of 50 pounds, for example.

If the accelerator pedal 170 of Fig. 7 is advanced, the spring 106a of Fig. 13 is compressed and the regulator valve 105 is loaded in the leftward direction to seal the vent port 108. This causes a rise of pressure in the pump line 110 which being also exerted thru orifice 107, increases the fluid pressure force tending to open the port 108, which action now occurs at a higher line pressure, for example 90 pounds.

Should the accelerator pedal 170 of Fig. 7 be fully depressed, and spring 106a fully compressed, the line pressure at which port 108 is opened could rise to 120 pounds, for example.

Now it must be remembered that this line pressure is fed by the governor device of Figs. 5 and 6 to the clutch pistons 51 and 52 of Fig. 1, and since the available clutch torque capacity of either clutch is proportional to the axial loading force applied by its piston, the designer knowing the clutch plate area, the piston area, the pump capacity and the characteristics of the regulator valve and springs may plot the line pressure requirements for the clutches with respect to the engine torque avilable for a given throttle opening, leaving a margin for such changes in clutch plate coefficient of friction, oil viscosity, and wear of parts which otherwise could tend to bring on a slip condition on the clutch faces, and thereby assure long-continued useful operation of the system without slip of the clutches.

This method has been under test for many thousands of miles and the useful results obtained correspond wholly to the above instructions. This control has the advantage of simplicity with little chance for the device to fail to function properly after calibration of the spring 106a and setting of the mechanical linkage of Fig. 7 with respect to the stroke of cam 175 of Fig. 13 and the permitted throttle opening at 223 in Fig. 7.

A designer using this system may be momentarily puzzled by the fact that direct drive clutch plate 9 delivers only engine torque, whereas plate 8 delivers torque multiplied thru the gears 13—24 and 25—10, and since both clutches are exposed to the prevailing line pressure, it would be thought that in the case of equivalent or equal piston and plate areas, the pressure value required to load plate 8 without slip would be more than adequate to load plate 9.

This reasoning would be correct, therefore it is desirable to stage the respective clutch torque capacities proportionally to the net torques to be handled, hence the diameters or the pressure areas of pistons 51 and 52 of Fig. 1 are shown proportional to the scalar differences in the net clutch torques to be delivered. By using pistons of dissimilar areas for the two torque ranges to be covered by the same pump line pressure, the present invention provides an extremely simple control of clutch torque capacity.

In the practice of economy in manufacture, it may be desirable to have the two clutch pistons of the same areas, in which case, the coefficients of friction of plate 9 and the adjacent gripping surfaces in oil would be of one value, for example 0.204, and of the clutch plate 8 and its adjacent gripping surfaces would be of a proportionally higher value in oil, for example 0.276, such that there would be automatic compensation for the torque capacity difference to be established commensurate with the 2nd speed-to-High speed ratio torques, sustained from a common fluid pressure loading means. It is not deemed necessary to make a pictorial showing of the two clutch pistons of common area for one skilled in the art to make use of this teaching.

Under operating conditions of advanced throttle when the vehicle speeds are high, both pumps P and Q are operating at full capacity and providing full line pressure. Relaxing of the throttle unloads spring 106a of Fig. 13 and the pressure of the pump line in port 104 will pass into port 108 of valve 105 and appear in the delivery space 41 for the feed of fluid flywheel 4, 5. Since it is useful to hold the fluid flywheel working pressure within predetermined design limits the space 41 is equipped with valve 221 loaded by spring 222, for spilling excess fluid flywheel inlet pressure directly back to the sump, therefore the maximum input pressure which is fed to the fluid flywheel working space is definitely limited. The valve 221 also responds to the pressure of the working space and during intervals when the valve 105 may close port 104 from line pressure or when the line pressure is greater than the working pressure, valve 221 will relieve, at a port pressure of 30 to 60 pounds, for example.

The space to the left of rotor 5 in Fig. 1 is connected by passage 44 to the outlet of valve 45 and serves to lubricate the clutches 8 and 9, inside the overhanging drum attached to flywheel 2, the starter gear teeth of which throw the spent oil into a scoop pipe for returning the fluid to the gear casing for recirculation. Valve 221 of Fig. 13 feeds passage 46a of Fig. 1.

The spring 45a is calibrated with respect to the desired operating fluid flywheel pressure and line pressure range so that a constant flow of lubricating oil is delivered to passage 46. At the close of operation when the pumps P and Q come to rest, line pressure falls, while the condition of relaxed throttle permits the line to continue to feed space 41 down to the lower pressure level determined by spring 106a.

As the pressure feed is gradually shut off and the throttle is relaxed, the engine-connected rotor falls in speed, and the line pressure value gradually diminishes in space 41 as well as in the working space. The valve seals space 41, while at a given low pressure, valve 45 closes off passage 46 from passage 44, trapping a body of oil in the working space.

Conversely upon starting the engine, rotor 4 spins the body of liquid of the working space outward creating a suction effect in space 41 while the pump P begins delivery of fluid to line 110 and to port 104 of valve 105. When the line pressure rises to 50 pounds, spring 106b is compressed and port 108 is open by valve 105 to line pressure which is delivered to space 41 and to the fluid flywheel working space.

These pressure values are so taken with respect to the required fluid flywheel filling and clutch pressures for given torques on the pistons 51 and 52, that if an impatient driver should immediately connect the drive by shifting slider body 47 to forward drive position, and depresses the accelerator pedal to full throttle, the rise of pressure delivered by pump P and augmented by pump Q will quickly overcome springs 106a and 106b, completing the filling of the fluid flywheel working space rapidly, and the net line pressure available for loading the clutch 8 of the 2nd speed drive will be fully adequate by the time that the speed of the shaft 50 and governor mechanism of Fig. 5 has risen to the 2nd speed selection condition, which latter is delayed by the action of the pump line pressure in spaces 208, 209, 210 fed from common manifold 207, passages 199 and 206 of the governor.

It is therefore practically impossible for the driver to abuse the mechanism or the clutches by sudden or abrupt initiation of drive.

The drawings herewith represent an actual construction which has been tested in full size in a vehicle in many miles of successful operation, and one skilled in the art will find that the relative dimensions of the parts are approximately correct for a standard motor vehicle of passenger car size. The present system initiates its control action with a regulated line pressure which constantly varies both with speed and with torque demand, and the selector valving stands between that automatically varying line pressure and the clutch cylinders, as a kind of gate mechanism, the net result being that the required servo actuation pressure for any drive condition within the design torque limits of the clutches is already waiting for the gate action of the ratio selection valving.

This method enables the pump capacity and that of the connecting system to be correlated with the required volumetric capacity of the clutch cylinders, with respect to time, so that the allowable changes in engine speed and torque which may occur during a ratio shift interval, can never create a torque value greater than the available torque capacity of either of the clutches.

It is further desirable that the torque be not fully released during alternate operation of the clutches 8 and 9, which effect is assured by proper design of the ports and passages of the actuation and control system, and by the spacing of the porting with respect to valve travel.

The preceding data has not explained another useful feature of the invention, which provides drive with engine braking for mountains or gradients, and over gravel, and over soft or icy roadbeds.

Fig. 13 shows valve 180 having porting connected to the pressure regulated line 110, and connecting same to output port 181 and the line 182. Valve 180 is operated by the driver, thru mechanical connection to the structure shown in Figs. 2 and 7. When in the position "D," there is no interference, and the automatic ratio operation described above proceeds. When placed in position "II," the pump line pressure is delivered from port 185 to port 186 and line 184, forcing the valve 190 of Fig. 5 to shift to 2nd speed position and under this control, neither Direct nor Low can be operative, since the action of valve 290 of Fig. 5 is set aside, therefore the operator may drive continuously in 2nd speed ratio while the road conditions require it.

A simple shift of the valve from position "II" to position "D" restores normal automatic ratio selection. The hand control mechanism explained in connection with Fig. 7 is arranged to provide handy "forced 2nd" drive, whenever needed.

When the valve 180 is moved leftward to "I" position the pump feed to the governor in line 182 is cut off, the latter line being opened to exhaust, which holds the drive in low, since the governor cannot now provide up-shift.

The foregoing description of the construction of the example of the invention, and its operation is believed sufficiently clear for one skilled in the art to reproduce the invention and to make use of its advantages and features constituting the combinations disclosed and to be claimed below.

There are advantages in the compactness of the shafting, gearing and clutch elements not before believed revealed in this art, and additional advantages in the arranging of the devices herein for fluid pressure operation. In point, it is believed novel to mount a complete governor and ratio shifter control valve assembly within a driven-shaft clutch drum, and to provide the governor overcontrol means thru fluid pressure piping leading to the valves of the governor and shifter valve assembly.

This particular feature shortens the effective lengths of the servo passages to the actuator pistons as against other governor assembly forms, and enables the delicate and vulnerable automatic control elements to be protected and isolated from accidental distortion or breakage. In this the clutch torque-capacity conditioning arrangement by which the degree of clutch-actuating fluid pressure is accelerator pedal controlled, is another important and useful feature.

A further advantage of exceptional value is obtained from the special controlled inertia-absorption mechanism to facilitate smooth shift between neutral and forward or reverse.

The special drive arrangement which provides fluid-flywheel-sustained torque in the reduction gear drive trains, and positive 1-to-1 drive in top gear is a means of avoiding excess heat in driving over difficult terrain, especially when the external control provides clashless shift to and from neutral.

These and the various objects stated in the opening paragraphs of this specification are believed effectively demonstrated in the foregoing detailed description, without further discussion. The structures described herein have been built and tested in full-size in motor vehicles, and successfully operated over sufficient mileage to evaluate their worth. A priorly filed application for Letters Patent by the present applicant is my United States Serial Number 686,361, filed July 26, 1946, for improvements in "Drive Pick-Up Mechanism," now matured as Letters Patent No. 2,606,461, dated August 12, 1952, of which the present application is a continuation-in-part for the combinations there disclosed.

The foregoing described invention is capable of being applied to the problems here outlined in a wide range of specifically designed constructions embodying the principles and teachings of the demonstration, and it is to be understood that it lies within the ability of those skilled in the art to make use of such teachings and principles in various forms without departing from the combinations thereof believed to constitute the invention as set forth in the appended claims wherein such combinations are recited as follows.

I claim:

1. In power controls, a variable ratio transmission, actuator mechanism for changing the drive ratio of said transmission, fluid pressure means operative upon said mechanism for actuating the change of ratio of said transmission, a shaft connected to said transmission, control valves operable to direct fluid pressure to said means or to vent fluid pressure from said means, a rotating governor body attached to said shaft and formed to accommodate a radially-movable weight and a radially movable valve subject to centrifugal force for selecting the operation of said control valves in accordance with rise of speed of said shaft, and controllable variable resistance means operative to oppose the combined centrifugal force action of said weight and said valve under increase of the speed of said shaft.

2. The combination as set forth in claim 1, wherein radially spaced pressure delivery porting in said governor body provide pressure feed to one port of said porting during a predetermined speed range of said shaft and provide said feed to two ports of said porting during another speed range of said shaft.

3. The combination as set forth in claim 1, wherein said radially-movable valve moves radially inward with increase of speed of said shaft.

4. In a vehicle, a power shaft, a change speed gear having plural shafting and plural gear trains connected to said shafting, a clutch for each of said trains adapted to connect one of said trains to the driving power shaft, fluid pressure actuation means for said clutches supplied by pump means driven by motion of the vehicle, a control for said fluid pressure actuation means including clutch drive selecting valving adapted to respond to variations in driving speed of one element of said shafting and additional controllable valve means consisting of manually operable valving controlling the speed response of said selecting valving and thereby modifying the speed response of said selecting valving, said manually operable valving being operative further to set aside the speed response clutch drive selection action of said valving at the will of the operator by directing fluid pressure from said pump means to hold an element of said selector valving in a predetermined position.

5. In automatic drive controls, driving and driven shafts, a variable step-ratio transmission connecting said shafts, said transmission including a plurality of fluid-pressure-actuatable clutches adapted to transmit drive selectively from said engine shaft to said transmission, a centrifugal governor driven by rotation of one of said shafts, a fluid pressure actuation and control system for said clutches, including a valve operated by said governor and adapted to initiate a change of fluid pressure actuation of said clutches, pumping means and a pressure delivery space, and a ratio shift transition control valve effective to complete the change of clutch actuation pressure initiated by said governor-operated valve in accordance with the fluid pressure of said space.

6. The combination as set forth in claim 5, wherein there is a throttle control for said engine and including a valve of said system controlled by movement of said throttle control, said last-named valve being effective to vary the action of said governor upon said first-named governor-operated valve and further effective to vary the pressure acting upon said second-named ratio shift transition control valve.

7. The combination as set forth in claim 5, wherein there is a valve casing with porting for said second-named shift transition control valve arranged with respect to the pressure-responsive motion thereof such that for predetermined conditions in which the said first-named governor-operated valve initiates a shift to a higher drive ratio by said clutches a residual torque is maintained by the clutch being disengaged by said governor-operated valve until an equal torque value is being transmitted by the clutch being engaged.

8. A fluid pressure supply system having a pressure delivery line and clutch members to be actuated thereby, actuators for said clutch members, an arrangement of said system including a governor device adapted to receive fluid pressure from said pressure line and to deliver same selectively to said actuators, said device including a radially movable weight attached to a radially movable valve which is effective to connect said pressure line selectively to said clutch actuators with changes in speed of said device, and fluid pressure operated plunger means in said device placed to oppose the speed-increasing motion of said weight, said plunger means responding to the variations of pressure in said pressure line and thereby vary the speed effect at which said radially movable valve changes the delivery of pressure of said line to said actuators.

9. The combination as set forth in claim 8, wherein a ratio shift transition control valve is placed between the said radially movable valve and the connections to said clutch actuators, said ratio shift transition control valve responding to the pressure applied to said clutch actuators for determining the instant for completing the change of pressure initially selected by said radially movable valve.

10. The combination as set forth in claim 8, wherein an engine throttle control and a pressure-varying valve is operated thereby for changing the degree of pressure acting upon said plunger means, in accordance with advancing or retarding of said throttle control.

11. The combination as set forth in claim 8, wherein a manually operable overriding control is provided for said governor device consisting of a ratio shift transition control valve and of a manually operable valve placed in said system to divert the pressure of said line from said device to said shift transition control valve so as to compel selected delivery of pressure from said line to one of said clutch member actuators for continued drive by said clutch member actuator selected.

12. In power devices, an engine shaft and a load-connected driven shaft, a variable step-ratio transmission adapted to couple said shafts, an engine flywheel, a drum attached to said flywheel and to the impeller of a fluid drive unit, a fluid rotor of said unit housed within said drum and driving a hollow shaft, a second hollow shaft within said first hollow shaft and connected to a clutch plate, a transmission shaft within said hollow shafts and attached to a clutch drum adapted to grip said clutch plate selectively, a second clutch plate attached to said engine shaft and operative to be selectively gripped by said clutch drum, gearing arranged to couple said hollow shafts and said transmission shaft to the load of said driven shaft in a plurality of torque paths, and control means for said gearing and said clutches effective to actuate and select a range of reduction ratio drives by said gearing in which the said unit transmits torque, and to select direct drive between said engine and said driven shafts.

13. The combination as set forth in claim 12, wherein a freewheel clutch is located in one of said torque paths of said gearing adapted to alternate drive with the clutch plate of said first-named hollow shaft connected thru said gearing in another of said torque paths.

14. The combination as set forth in claim 12, wherein there is a forward-neutral-reverse slider member of said gearing a forward-driving overrunning clutch coupled to transmit reduction drive of said gearing to said transmission shaft in one of said paths, said clutch being connected for such drive by shift of said slider member to forward position.

15. The combination as set forth in claim 12, wherein a forward-neutral-reverse slider member of said gearing is provided having jaw teeth and of mating jaw teeth on the adjacent end of the second-named of said hollow shafts for transmitting torque therebetween.

16. The combination as set forth in claim 12, wherein a forward-neutral-reverse position shifter member operated by said gearing control means is provided and of a spin-prevention means also operated thereby for stopping the rotation of said gearing during transitional movement of said shifter member between operative positions.

17. The combination as set forth in claim 12, wherein a governor device is included in said control means and is operative to select changes in forward driving ratio by controlling the selective actuation of said clutch plates.

18. The combination as set forth in claim 12, wherein a governor device is included in said control means for selecting forward drive ratio by selective actuation of said clutches, and a mechanism is provided to be operated by predetermined manual selection of the control means for said gearing, effective to nullify the action of said governor device for given settings of said gearing control means.

19. A gearing unit coupling input and output shafts thru plural gear trains connected selectively by a plurality of clutch devices, said unit having a freewheel clutch in the lowest speed ratio gear train and a translatable slider body adapted to couple the drive of said lowest gear train thru said clutch, braking means for one of said trains and a common control for said braking means and for the motion of said slider body effective to cause energization of said braking means between the drive control positions of said slider body.

20. A gear unit adapted to couple driving and driven shafts including a plurality of drive transmitting elements providing torque paths independently selected, a forward-neutral-reverse shift control member for said gear unit, a transmission slider body of said unit moved by said member including a freewheel clutch brought into the power train of the gear unit in the forward drive-establishing position of said member, one part of said clutch being coupled to the driven shaft by such forward position motion, a spin-prevention device operative to stop rotation of said elements, a control for said device, and connecting means between said member and said device control operative to energize said device during the interval of shift of said body toward said forward drive position of said member.

21. A step-ratio gear unit having a reverse gear idler effective to transmit torque in reverse from a primary shaft drive connection to a driven shaft drive, gear unit elements adapted to be coupled to said drive, said unit having a manually operable control means operative to disconnect the said drive connection in one position and to connect the drive of said elements thru said reverse gear idler in another position, a controllable braking means for said idler adapted to stop rotation of said idler and of the gear unit elements coupled thereto by said drive connection, and a control for said braking means made effective by motion of said control means between said disconnecting and driving positions.

22. The combination as set forth in claim 21, wherein a power means is provided for energizing said braking means and a control mechanism for said power means is connected to the drive-connecting and disconnecting control means, said mechanism causing energizing operation of the power means during transition of said drive control means between drive-disconnecting and connecting positions.

23. The combination as set forth in claim 21, wherein are provided engageable friction elements in said braking means and there is provided a rotation-responsive means responsive to rotation of said idler for loading said friction braking elements.

24. The combination as set forth in claim 21, wherein are provided engageable friction elements in said braking means, self-loading means cooperating with said elements for increasing the effect of friction braking thereof, and a power means is provided operative to initiate the energizing action of said self-loading means in causing said idler to come to rest.

25. The combination as set forth in claim 21, wherein are provided friction braking elements in said braking means, a self-loading device operative to press said elements together for causing braking, power means adapted to initiate the action of said device and a control connection is provided for said power means operated by the said drive connecting and disconnecting control means when same is moving between said positions.

26. A power transmission drive embodying a plurality of clutches providing different drive speed ratios between input and output shafts, fluid pressure actuators for said clutches, a governor device driven by one of said shafts and embodying a radially movable weight connected to a radial valve moved inward radially with increase of speed of said shaft the inward motion of said valve being effective to deliver pressure to said clutch actuators for providing upward change of drive speed ratio toward direct drive by said clutches, and overcontrol means for said weight and said valve operative to vary the action thereof for selection of the timing of said valve in selecting actuation of said clutches.

27. In power devices, an engine, a gearing unit adapted to provide multiple trains for driving a driven shaft, said gearing unit including a countershaft geared to said driven shaft, a clutch drum attached to said driven shaft, first and second hollow shafts concentric with said driven shaft and geared to said countershaft, a direct drive clutch plate arranged to be driven by said engine and engageable with said drum, an intermediate speed ratio clutch plate attached to the second of said hollow shafts and likewise engageable with said drum, actuator means for said plates, a fluid flywheel unit having an impeller driven by said engine and a driven rotor attached to the first of said hollow shafts for providing torque to drive said driven shaft for low gear and intermediate speed ratio thru said second named clutch plate, and control means made operative by changes of speed of said driven shaft effective to select the drive ratio by energization of said actuator means.

28. In power transmission apparatus, a primary shaft, a secondary shaft, a driven shaft concentric with said shafts, a driven clutch drum attached to said driven shaft, clutch pressure loading and gripping means mounted in said drum adjacent its outer radial dimension, a clutch plate fixed to said primary shaft and arranged to be gripped to said drum, a second clutch plate fixed to said secondary shaft and arranged to be gripped to said drum, an inner radial space in said drum adjacent said driven shaft and automatic governor means mounted in said space to rotate with said driven shaft and effective to control said clutch loading and gripping means selectively in accordance with driven shaft speed.

29. In variable power drives, an engine, a throttle control for said engine, driving and driven shafts, a variable speed ratio transmission coupling said shafts and including friction clutches adapted to transmit direct and reduction drive, fluid pressure actuators for said clutches, pumping means driven by one of said shafts for providing fluid pressure to actuate said clutches, a fluid pressure governor device embodying ratio selector valving operative to apply the pressure of said pumping means to said clutch actuators and embodying fluid pressure operated means to modify the selective action of said device, and a valve effective to deliver pressure derived from said pumping means to said fluid pressure operated means for modifying same in accordance with movement of said throttle control.

30. In a motor vehicle the combination of an engine, an engine throttle, an accelerator pedal for operating said throttle, a step-ratio gearing unit driven by said engine and driving a load shaft, controlling means for said gearing unit, mechanism for initiating the drive of said shaft means for automatically changing the forward drive gear ratio of said unit following said initiation in accordance with variations in speed of said shaft, a connection from said pedal to said automatic ratio changing means for varying the automatic ratio changing operation thereof, a control for said drive-initiating mechanism, and connecting means between said drive-initiating mechanism control and said automatic gear-changing means operative under predetermined positioning of said control to prevent automatic operation of said gear-changing means or of effective action thereon by said connection while compelling drive selectively in one or another of two reduction speed ratios.

31. In a motor car, an engine, an engine speed control, a load shaft, a gearing train having a plurality of reduction paths adapted to couple said shaft and said engine, a plurality of clutches each operable for connecting one of said paths with said engine, governor-operated means effective to select the connection of each of said clutches, manually operated means operable upon said train for selecting the initial connection of said gearing to said shaft, means operated by said engine speed control for modifying the action of said governor-operated means and a connection from and operated by said manually operated means to set aside the action of said governor-operated means and compel drive in selected reduction gear paths by said clutches.

32. In power drive mechanisms, a power shaft and a load shaft, a fluid turbine device, a step ratio gear transmission adapted to couple said shafts directly and at reduced speed ratios in which latter the increased torque drive is transmitted by said fluid turbine device and incorporating one path of torque in which one of said reduced speed ratios is provided by the agency of an overrunning clutch, friction clutch means included in said transmission operative to couple the shafts directly and to couple them for speed ratio drive intermediate direct drive and that ratio provided by said overrunning clutch, an actuator mechanism for said friction means, and a control for said mechanism effective to transfer the torque from said overrunning clutch torque path to said intermediate drive automatically in accordance with increase of speed of said load shaft.

References Cited in the file of this patent

UNITED STATES PATENTS

| | | |
|---|---|---|
| 1,855,882 | Hoelscher et al. | Apr. 26, 1932 |
| 2,161,088 | Reilly et al. | June 6, 1939 |
| 2,183,761 | Aspinwall et al. | Dec. 19, 1939 |
| 2,204,872 | Thompson | June 18, 1940 |
| 2,208,518 | Ross | July 16, 1940 |
| 2,261,051 | Cassell | Oct. 28, 1941 |
| 2,277,800 | Syrovy | Mar. 31, 1942 |
| 2,322,479 | Schjolin | June 22, 1943 |
| 2,332,593 | Nutt et al. | Oct. 26, 1943 |
| 2,335,255 | Banker | Nov. 30, 1943 |
| 2,342,985 | Tyken et al. | Feb. 29, 1944 |
| 2,344,656 | Swennes | Mar. 21, 1944 |
| 2,373,453 | Brunken | Apr. 10, 1945 |
| 2,376,545 | Livermore | May 22, 1945 |
| 2,380,677 | Schjolin | July 31, 1945 |
| 2,395,459 | Carnagua | Feb. 26, 1946 |
| 2,606,461 | Herndon | Aug. 12, 1952 |
| 2,627,189 | McFarland | Feb. 3, 1953 |
| 2,648,992 | Vincent | Aug. 18, 1953 |